(12) United States Patent
Day

(10) Patent No.: US 11,161,539 B2
(45) Date of Patent: Nov. 2, 2021

(54) TRANSPORTATION APPARATUS

(71) Applicant: All Day Designs Ltd., Glasgow (GB)

(72) Inventor: Amanda Day, Glasgow (GB)

(73) Assignee: All Day Designs LTD., Glasgow (GB)

(*) Notice: Subject to any disclaimer, the term of this patent is extended or adjusted under 35 U.S.C. 154(b) by 0 days.

(21) Appl. No.: 16/322,213

(22) PCT Filed: Aug. 1, 2016

(86) PCT No.: PCT/GB2016/052369
§ 371 (c)(1),
(2) Date: Jan. 31, 2019

(87) PCT Pub. No.: WO2018/025002
PCT Pub. Date: Feb. 8, 2018

(65) Prior Publication Data
US 2019/0176866 A1    Jun. 13, 2019

(51) Int. Cl.
| | | |
|---|---|---|
| *B62B 7/04* | (2006.01) |
| *B62B 7/12* | (2006.01) |
| *B62K 9/02* | (2006.01) |
| *B62M 1/38* | (2013.01) |
| *B62K 13/04* | (2006.01) |
| *B62B 9/20* | (2006.01) |
| *B62B 7/14* | (2006.01) |

(52) U.S. Cl.
CPC ............ *B62B 7/12* (2013.01); *B62B 7/042* (2013.01); *B62K 9/02* (2013.01); *B62K 13/04* (2013.01); *B62M 1/38* (2013.01); *B62B 7/044* (2013.01); *B62B 7/147* (2013.01); *B62B 9/20* (2013.01); *B62B 2206/006* (2013.01); *B62B 2206/06* (2013.01); *B62B 2301/02* (2013.01)

(58) Field of Classification Search
CPC .. B62B 7/142; B62B 7/12; B62B 7/14; B62B 7/06; B62B 7/042
See application file for complete search history.

(56) References Cited

U.S. PATENT DOCUMENTS

| | | | | |
|---|---|---|---|---|
| 5,388,659 A | * | 2/1995 | Pepe ...................... | B62K 3/002 180/208 |
| 6,755,690 B1 | * | 6/2004 | Zhang .................. | H01R 13/658 439/607.02 |
| 7,364,182 B2 | * | 4/2008 | Jane Santamaria ....... | B62B 7/10 280/47.38 |

(Continued)

FOREIGN PATENT DOCUMENTS

| | | |
|---|---|---|
| CN | 2578212 Y | 10/2003 |
| JP | 2011131787 A | 7/2011 |

(Continued)

OTHER PUBLICATIONS

International Search Report and Written Opinion prepared for PCT/GB2016/052369 dated Jun. 26, 2017.

*Primary Examiner* — Hau V Phan
(74) *Attorney, Agent, or Firm* — F. Michael Sajovec; Williams Mullen

(57) ABSTRACT

A transportation apparatus reconfigurable between at least two modes of operation. Each mode of operation comprises a mode of transport. A first mode of operation comprises a stroller, push-chair or perambulation (pram) mode. A second mode comprises a velocipede mode, such as a tricycle, bicycle and/or quadricycle mode.

21 Claims, 19 Drawing Sheets

(56) References Cited

U.S. PATENT DOCUMENTS

| | | | | |
|---|---|---|---|---|
| 7,832,755 | B2* | 11/2010 | Nolan | B62B 7/068 |
| | | | | 280/47.18 |
| 8,585,075 | B2* | 11/2013 | Zhong | B60N 2/2845 |
| | | | | 280/47.38 |
| 9,216,755 | B2* | 12/2015 | Eisinger | B62B 7/06 |
| 2002/0050700 | A1* | 5/2002 | Stohr | B62B 7/06 |
| | | | | 280/650 |
| 2006/0103085 | A1* | 5/2006 | Sanchez | B62B 7/14 |
| | | | | 280/30 |
| 2008/0211206 | A1* | 9/2008 | Thorne | B62B 7/083 |
| | | | | 280/650 |
| 2009/0014985 | A1* | 1/2009 | Huang | B62B 7/068 |
| | | | | 280/647 |
| 2009/0315299 | A1* | 12/2009 | Barenbrug | B62B 9/10 |
| | | | | 280/642 |
| 2010/0001492 | A1* | 1/2010 | Driessen | B62B 7/145 |
| | | | | 280/642 |
| 2012/0153583 | A1* | 6/2012 | Yuan | B62B 9/28 |
| | | | | 280/30 |
| 2013/0056949 | A1* | 3/2013 | Bricker | B62M 1/38 |
| | | | | 280/259 |
| 2015/0231114 | A1* | 8/2015 | Xue | A61K 31/5377 |
| | | | | 514/210.18 |
| 2015/0329165 | A1* | 11/2015 | Page | B62K 21/20 |
| | | | | 280/266 |
| 2017/0072982 | A1* | 3/2017 | Thorne | B62B 7/068 |
| 2017/0240197 | A1* | 8/2017 | Oakes | B62B 7/142 |
| 2017/0354468 | A1* | 12/2017 | Johnson | A61B 34/30 |

FOREIGN PATENT DOCUMENTS

| | | |
|---|---|---|
| KR | 200451119 Y1 | 11/2010 |
| WO | 2010128633 A1 | 11/2010 |

* cited by examiner

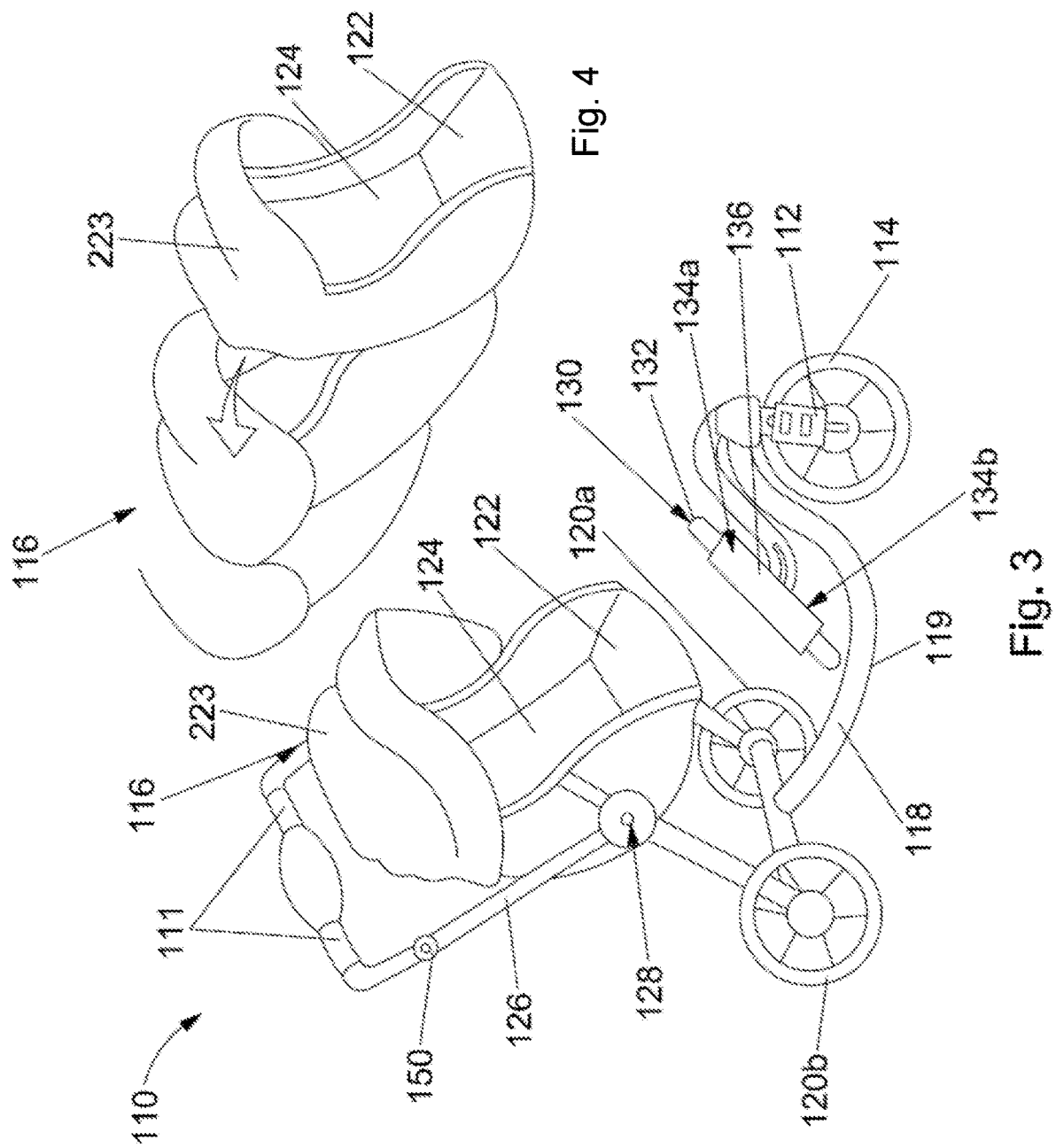

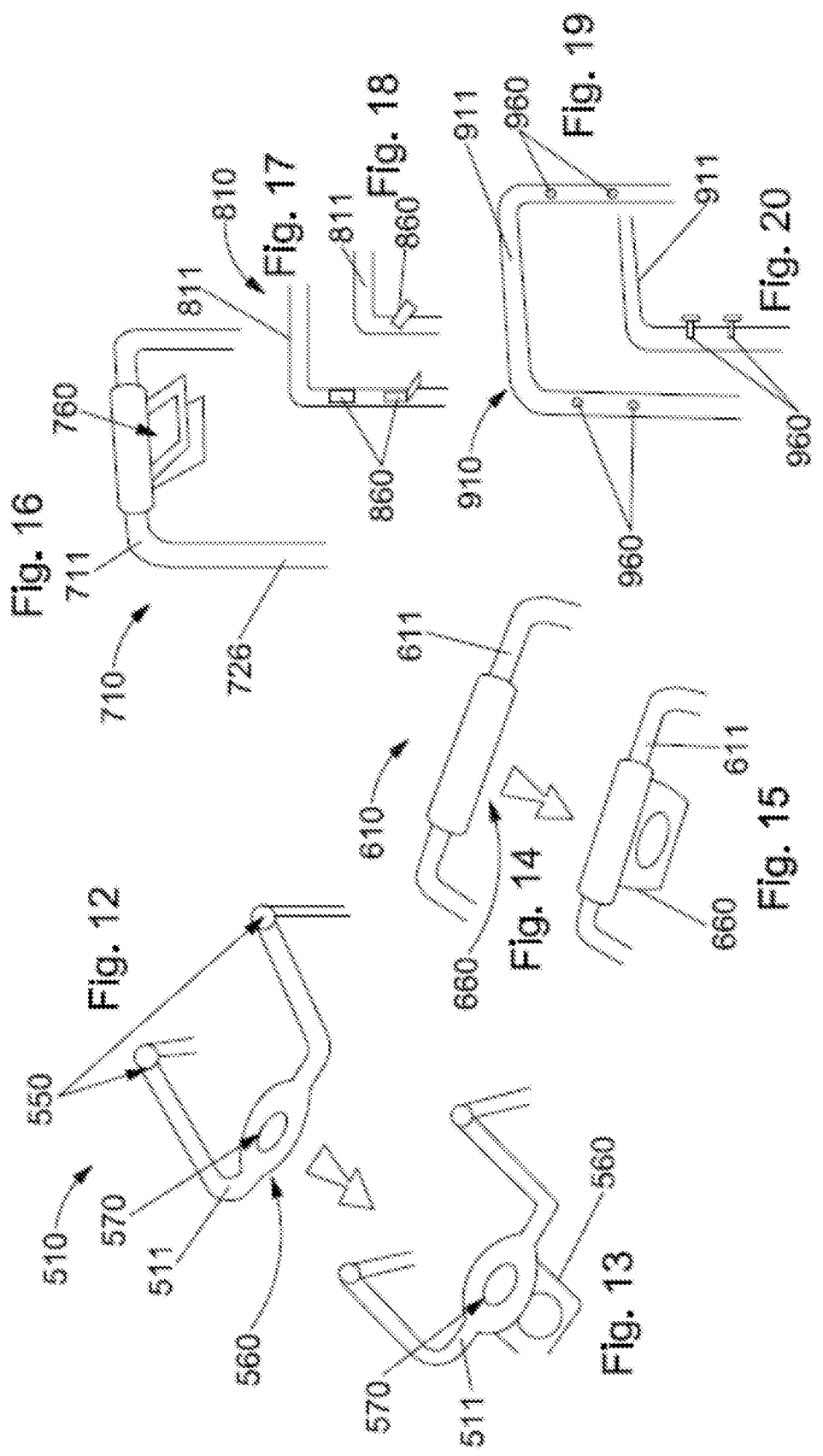

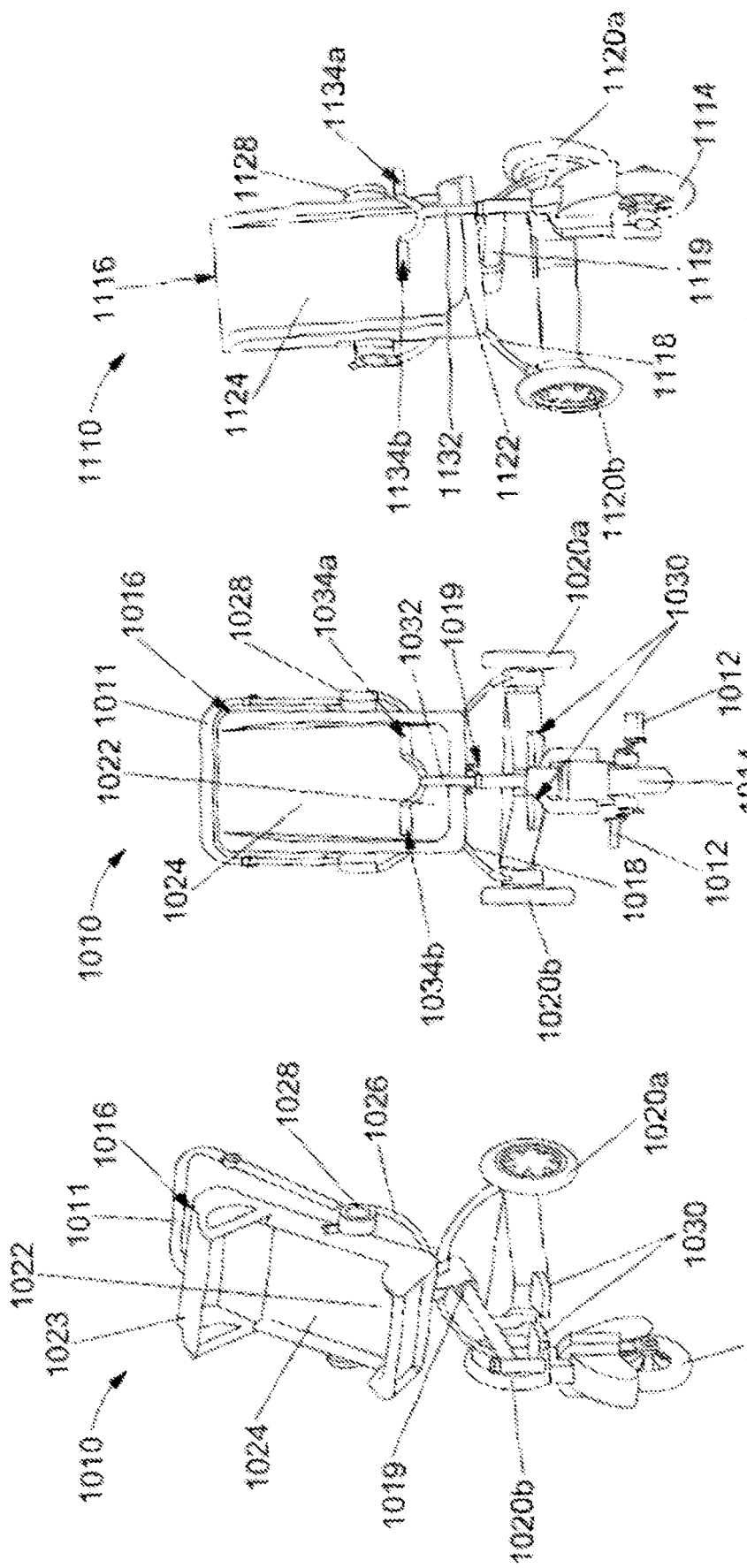

TRANSPORTATION APPARATUS

CROSS-REFERENCE TO RELATED APPLICATIONS

This application is the U.S. National Stage of International Application PCT/GB2016/052369, filed Aug. 1, 2016, which designates the U.S. and was published by the International Bureau in English on Feb. 8, 2018, is hereby incorporated herein in its entirety by reference.

FIELD

Embodiments described herein relate generally to a transportation apparatus and associated methods; and in particular, but not exclusively, to a child transportation apparatus reconfigurable between at least two modes of operation.

BACKGROUND

Strollers, perambulators (prams) or pushchairs are used to transport children who may not be able to or may not wish to walk or otherwise propel themselves on an entire journey or trip. Children, particularly toddlers or young children, may not be as capable or willing to walk for as far or as long as an accompanying adult. Accordingly, strollers, perambulators (prams) or pushchairs provide the ability for the accompanying adult to push the child along for all or parts of the journey or trip as appropriate.

The child may become restless or lack stimulation when pushed the entire time, so the child may not wished to be pushed along sitting, lying or slouching in a stroller, perambulator (pram) or pushchair for the entire time. The child may wish to be active, such as to get out of the stroller, perambulator (pram) or pushchair, perhaps walking for at least a part of the journey or trip.

Where a child's walking may be tiresome for the child and/or the accompanying adult, another form of child transportation may be desirable for the child and/or the accompanying adult. For example, the child and or the accompanying adult may wish the child to use a scooter, tricycle, bicycle or the like. The scooter, tricycle, bicycle or the like may allow or assist in transporting the child at a pace conforming or better conforming to a desired pace of the accompanying adult, such as when compared to the child's walking pace. The scooter, tricycle, bicycle or the like may allow or assist the child to be stimulated or entertained. For example, the child may consider scooting or cycling to be more fun than walking. Scooting and cycling may provide alternative transport to walking or sitting in a stroller or pushchair.

Typically at the start of a journey or trip a child and/or the accompanying adult may have a free choice whether to complete the journey or trip by waking and/or pushing in a pushchair, stroller or perambulator (pram); or to complete the journey by walking and/or scooting or cycling or the like. Accordingly, either a pushchair, stroller or perambulator (pram) can be taken for the journey or trip; or a scooter, tricycle, bicycle or the like can be taken for the journey or trip.

It may be an object of at least one or more embodiments or features of the present disclosure to address one or more problems or disadvantages associated with the prior art.

SUMMARY

This disclosure provides a transportation device which can convert between a number of different modes. For example, in one mode, the device can be a stroller (or "pram") type device and in another mode, the device may take the form of, for example, some sort of pedal powered device.

Thus, according to a first aspect there is provided a transportation apparatus comprising:

a frame, the frame having an engagement portion or receiving portion adapted to receive one or more occupant support devices, wherein the frame has a first configuration and a second configuration, and wherein the engagement portion or receiving portion moves between the first configuration and the second configuration.

The effect of this is to allow an occupant support device, which is engaged with the engagement portion, to move as the frame of the transportation apparatus is altered between the first and second configurations. For example, in the first configuration the apparatus may take the form of a stroller or pram type device with the engagement portion of the frame being suitably located to receive an occupant support device in a suitable (stroller/pram) orientation or position. In the second configuration the apparatus may take the form of a tricycle, for example, and in this configuration the engagement portion will occupy a position suitable receive the occupant support device in a suitable orientation or position. In such an example the first configuration of the frame may be suitable for use of the apparatus as a stroller or pram and the second configuration of the frame may be suitable for use of the apparatus as a tricycle or the like.

The apparatus may comprise at least one wheel attached to the frame. The engagement portion or receiving portion may be located nearer the at least one wheel in the second configuration than in the first configuration.

The apparatus may comprise at least one front wheel attached to the frame. The engagement portion or receiving portion may be located nearer the at least one front wheel in the second configuration than in the first configuration.

Thus, in one embodiment, there is provided there is provided a transportation apparatus comprising:

a frame, the frame having an engagement portion adapted to receive one or more occupant support devices; and at least one wheel, e.g., front wheel, attached to the frame, wherein the frame has a first configuration and a second configuration, and wherein the engagement portion is located nearer the at least one wheel, e.g., front wheel, in the second configuration than in the first configuration.

The transportation apparatus may be a child transportation apparatus.

It will be herein understood that the term "engagement or receiving portion" may not necessarily be limited to providing a releasable connection, but may also include or provide a permanent and/or one-piece connection between the frame and one or more occupant support devices.

The engagement portion or receiving portion may be adapted to releasably receive one or more occupant support devices. In such instance the engagement portion or receiving portion may comprise or may define a releasable connection between the frame and one or more occupant support devices. One or more occupant support devices may be detachable from the engagement portion or receiving portion, and/or from the frame. By such provision, the apparatus may be arranged to receive a number of different occupant support devices which may be selected depending on the age and/or size of the child, whether the child is asleep or awake, etc. The engagement portion or receiving portion may comprise a region of the frame to which one or more occupant support devices is attachable. In such instance, a region of the frame may define the engagement portion or receiving portion. Thus the engagement portion can be the frame or can be on any part of the frame and may comprise a portion suitable to receive one or more occupant support devices. The one or more occupant support device may then be releasably fixed thereto by any push, interference fit mechanism, screws/bolts, loop-hook fastenings, or the like. One or more occupant support devices may have features complementary to features of the engagement portion or receiving portion. By such provision, the engagement portion or receiving portion may be adapted to interact with and/or connect to one or more occupant support devices.

The engagement portion or receiving portion may be adapted to permanently receive one or more occupant support devices. In such instance the engagement portion or receiving portion may comprise or may define a permanent connection between the frame and the one or more occupant support devices. The one or more occupant support devices and the frame may define a unitary or one-piece structure. In such instance, the engagement portion or receiving portion may not define a separate part from the frame and/or occupant support device(s), but may form part of the frame and occupant support device(s), and/or may for part of the unitary or one-piece structure.

The frame may comprise one or more, e.g., a plurality of, engagement portions or receiving portions. Each engagement portion or receiving portion may be adapted to receive one or more occupant support devices. By such provision, the apparatus may have a number of engagement portions or receiving portions, each engagement portion or receiving portion being adapted to receive one or more of the occupant support devices. This may be advantageous as the sizes, shapes and positions of the occupant support devices being compatible with the apparatus may vary. Thus, despite the possible differences in shapes, sizes and positions between the various occupant support devices, the provision of a plurality of engagement portions or receiving portions may allow the apparatus to receive each of the occupant support devices.

Occupant support devices may be selected from, but are not limited to, a carrycot, a seat such as a car seat, a midi seat, or a stroller seat, a bicycle saddle and/or tricycle saddle, and the like. Occupant support devices may be configured to accommodate one or more occupants. For example, one or more occupant support devices may be configured to accommodate an infant, a baby, a toddler, a child or an adult.

The frame may be foldable. The frame may be configured to be folded, for example for ease of storage. The frame may be foldable with an occupant support device attached to it. The frame may be configured to be folded without an occupant support device attached to it.

In use, the transportation apparatus and/or frame may be in a deployed and/or non-folded state. The first configuration and the second configuration may be provided in the deployed and/or non-folded state. By such provision, a non-occupant user, that is, a person who pushes and/or steers the apparatus but is not located in the apparatus, may move, change or alter the frame from the first configuration to the second configuration without the need to fold the apparatus or frame and/or without requiring removal of the/an occupant support device or occupant thereof. The frame may be moved, changed or altered from the first configuration to the second configuration without removal of the/an occupant support device or occupant thereof.

In the deployed and/or non-folded state of the transportation apparatus and/or frame, the engagement portion or receiving portion may be located at a different height when the apparatus is in the second configuration, e.g. relative to a ground-engaging portion of the apparatus, compared to the location of the engagement portion or receiving portion when the apparatus is in the first configuration. In the second configuration, the position or location of the engagement portion or receiving portion may be lower relative to the position or location of the engagement portion or receiving portion in the first configuration. Moving the frame from the first configuration to the second configuration may lower the engagement portion or receiving portion, for example relative to the ground and/or relative to one or more wheels, e.g. relative to the one or more front wheels.

In the second configuration, the position or location of the engagement portion or receiving portion may be forward and/or nearer a front end of the frame and/or apparatus relative to the position or location of the engagement portion or receiving portion in the first configuration. Moving the frame from the first configuration to the second configuration may bring or move the engagement portion or receiving portion forward and/or nearer a front end of the frame and/or apparatus.

In the second configuration, the position or location of the engagement portion or receiving portion may be lower and nearer a front end of the frame and/or apparatus relative to the position or location of the engagement portion or receiving portion in the first configuration.

The frame may be moveable from the first configuration to the second configuration with an occupant support device attached to the engagement portion. The frame may be configured to move from the first configuration to the second configuration without an occupant support device attached to the engagement portion. Beneficially, the frame may comprise a single engagement portion suitable to receive one or more occupant support devices, e.g., each of the occupant support devices. By such provision, a non-occupant user does not require to alter the engagement portion or does not require any additional tools or attachment devices to attach one of the selected occupant support devices compatible with the apparatus and/or frame. Advantageously, the frame is moveable from the first configuration to the second configuration while the occupant is located on/in the occupant support device.

The frame may comprise any suitable means for moving from the first configuration to the second configuration. For example, the frame may comprise a base portion, and a top portion. The top portion of the frame may comprise or define the engagement portion or receiving portion. The base portion may provide at least one connection point for the top portion of the frame. The top portion may be pivotally connected to the base portion. For example, the top portion may be connected to the base portion by means of a hinge or a barrel. In use, the frame may be configured to move from the first configuration to the second configuration by moving the top portion forward and/or lower, e.g. forward and lower, relative to the base portion of the frame. The top portion may pivot about the connection point between the top portion and the base portion.

The frame may comprise one front wheel. The frame may comprise a plurality of front wheels, for example two or more front wheels. When the frame comprises two or more front wheels, the front wheels may be connected by an axle. The frame may comprise one or more rear wheels. The frame may comprise one rear wheel. The frame may comprise a plurality of rear wheels, for example two or more rear wheels. When the frame comprises two or more rear wheels, the rear wheels may be connected by an axle. For example, the frame may comprise one front wheel located at or near a front end of the frame and/or apparatus and two rear wheels located at or near a rear end of the frame and/or apparatus. Suitable wheels for the frame may comprise, but are not limited to, plastic wheels/tyres, rubber coated wheels/tyres, air-filled wheels/tyres, pneumatic wheels/tyres, air wheel tyres with sealed ball bearings, omni wheels, and the like.

The frame may comprise a brake adapted to restrict movement of the front wheel/wheels. The frame may comprise a brake adapted to restrict movement of the rear wheel/wheels. In use, when the brake is actuated, the movement of at least one of the front and/or rear wheels may be restricted. This is beneficial, for example when going downhill, if an occupant or a non-occupant user wants to ensure that the apparatus moves in a slow and controlled fashion and/or to ensure that the apparatus does not move at all. When the brake is not actuated the wheels may be configured to rotate freely.

The apparatus may comprise means for propelling, powering or driving, e.g. mechanically propelling, powering or driving, one or more wheels.

The propelling means may be configured to propel, power or drive, e.g. mechanically propel, power or drive, at least one front wheel, e.g. the front wheel.

The propelling means may be configured to propel, power or drive, e.g. mechanically propel, power or drive, at least one rear wheel. In such instance, the propelling means may be connected to at least one rear wheel by a drive mechanism such as a chain, belt, or the like. In an embodiment, at least one front wheel, e.g., the front wheel, may comprise the means for propelling, powering or driving, e.g. mechanically propelling, powering or driving, one or more wheels. For example, the at least one front wheel may comprise levers or pedals. The pedals may be integrated within the at least one front wheel. The pedals may be attached, for example permanently attached to the at least one front wheel. The pedals may be foldable and/or may be configured to be stored e.g. within the at least one front wheel. The pedals may be detachable from the at least one front wheel. Provision of detachable and/or foldable pedals may avoid or reduce the risk of damaging the pedals and/or injuring passers-by and/or the occupant when use of the pedals is not required, thus improving safety. The pedals may comprise a first, deployed configuration and a second, stowed configuration. Each pedal may extend along a plane substantially parallel to the ground in the deployed configuration. Each pedal may be folded within the at least one wheel, e.g. within a side thereof, in the stowed configuration. The pedals may comprise two modes of operation. In a first mode of operation, the pedals may be configured to move independently from an associated wheel, e.g. front wheel, and/or to move in a non-powering manner, thus providing free-wheeling action. In a second mode of operation, the pedals may be configured to move in a powering manner and/or may be locked relative to an associated wheel, e.g., at least one front wheel, for example relative to a rotation axis thereof, thus allowing powering of the at least one front wheel.

In another embodiment, the means for propelling, powering or driving, e.g. mechanically propelling, powering or driving, one or more wheels, may be provided within or may be attachable to a different part of the apparatus, e.g. the means for propelling, powering or driving, e.g. mechanically propelling, powering or driving, one or more wheels, may be provided within or may be attachable to the frame.

The configuration and/or orientation of the/an occupant support device relative to the frame may be modifiable/adjustable.

The orientation, e.g., inclination of the/an occupant support device may be modified and/or adjusted relative to the engagement portion of the frame, for example by means of a pivot point, rotational joint, swivel mechanism, or the like. In such instance, adjustment of the orientation of the/an occupant support device relative to the frame may be permitted by movement of the occupant support device relative to the engagement portion.

The orientation, e.g., inclination of the engagement portion may be modified and/or adjusted relative to the frame, for example by means of a pivot point, rotational joint, swivel mechanism, or the like. In such instance, adjustment of the orientation of the/an occupant support device relative to the frame may be permitted by movement of the engagement portion relative to the frame. Beneficially, modifying and/or adjusting the orientation, e.g., inclination of an occupant support device relative to the frame may optimise the posture of the occupant in each configuration. For example, in the first configuration, the occupant support device and/or occupant may be provided in a substantially horizontal configuration, which may facilitate relaxation and/or rest of the occupant, such as sleep. In the second configuration, the occupant support device and/or occupant may be provided in a more inclined position, e.g., at an inclination towards or nearer vertical, which may be a more suitable posture for observing surroundings, interacting with the environment, and/or engaging into a physical activity, e.g. for using the pedals.

The frame may comprise a holding member, for example a handle or handlebar for a non-occupant of the child transportation apparatus. In use, the non-occupant handle/handlebar may enable the frame to be propelled and/or steered by a non-occupant of the transportation apparatus. The non-occupant handlebar may be located at, behind, and/or near a rear end of the frame. The non-occupant handlebar may be extendable. For example, the non-occupant handlebar may be telescopic. This is beneficial to adapt the height of the handlebar to the height of the non-occupant. For example, a tall non-occupant may find more comfortable to push the apparatus with the non-occupant handle in an extended configuration, to prevent having to bend in order to reach the non-occupant handlebar.

The frame may comprise a steering member for an occupant of the transportation apparatus. The steering member may be incorporated within or may be integral to the frame. The steering member may be detachable from the frame. The steering member may be integrated within the frame. The steering member may be foldable. The steering member may be configured to be folded when not in use, for example to be stored within the frame. The steering member may be configured to be folded and stored within the frame in the first configuration. Advantageously, providing a steering member foldable and/or detachable from the frame when the apparatus is in its first configuration increases the comfort of the occupant of the transportation apparatus and facilitates the loading and unloading operations of the transportation apparatus.

The steering member may be configured to be deployed in the second configuration. The steering member may be configured to be engaged with and/or attached to the at least one front wheel in the second configuration. The steering member may enable steering of the transportation apparatus when the steering member is engaged with and/or locked relative to the at least one front wheel. The steering member may not enable steering of the transportation apparatus when the steering member is not engaged with and/or locked relative to the at least one front wheel. Advantageously, disabling engagement and/or the lock of the steering member relative to the at least one front wheel may increase the safety of the transportation apparatus and facilitate the manoeuvrability of the transportation apparatus by a non-occupant. The steering member may be releasably engageable with the at least one front wheel to enable steering of the transportation apparatus.

At least one wheel, e.g. any or all wheels, for example at least one front wheel, may be or may comprise an omni wheel. An/the omni wheel may comprise a plurality of rolling or rotating elements disposed around the circumference of the wheel. The rolling or rotating elements may be configured to turn and/or rotate in a direction and/or around an axis perpendicular to the rotational axis of the wheel. An omni wheel may enable a non-occupant of the transportation apparatus to change the direction of movement of the frame and/or transportation apparatus independently from the orientation of the at least one front wheel. For example, when a non-occupant steers the frame in a direction different of the direction of travel, the rolling portions of the wheel may rotate in a direction perpendicular to the direction of travel, thus enabling the movement of the omni wheel along the direction of rotation of the rolling elements. Beneficially, an omni wheel may allow the apparatus to turn and/or to be manoeuvred with reduced effort without the need to change the orientation of the omni wheel. When the frame is in the second configuration and comprises a steering member engaged with and/or attached to the at least one front wheel, the orientation of the at least one front wheel, e.g., omni whel, may be determined by a position of the steering member. Typically, when an occupant controls or handles the steering member, a non-occupant may not be able to change the direction of travel. This may cause damage to nearby objects and/or of injury to passers-by, to the occupant or to the non-occupant. Use of an omni wheel may permit a non-occupant to override the direction of travel when an occupant, e.g. a child, steers and/or powers the apparatus, e.g. at least one front wheel thereof, thus enabling a non-occupant to change the direction of movement of the apparatus without the need to alter the orientation of the wheel. Advantageously, an omni wheel that enables movement in a direction other than the direction of rotation of the wheel may enhance the safety of the apparatus comprising the omni wheel by eliminating the need of the wheel to change orientation upon steering, thus preventing or reducing the risk of damage to nearby objects and/or of injury to passers-by, to the occupant or to the non-occupant.

The child transportation apparatus may be reconfigurable between at least two modes of operation.

The child transportation apparatus may, in a first mode, be configured or configurable such that the occupant's feet at least one of not contact the ground or not be able to operate the pedals, for at least one size or age of child.

Each mode of operation may comprise a mode of transport. Each mode of operation may comprise a different mode of transport. Each mode of transport may be distinct. Alternatively there may be at least some overlap between the different modes of transport.

The child transportation apparatus may comprise a stroller, push-chair or perambulator (pram).

Additionally or alternatively, the child transportation apparatus may comprise a velocipede, such as a tricycle, bicycle and/or quadricycle.

A first mode of operation may comprise a stroller, push-chair or perambulation (pram) mode.

A second mode may comprise a velocipede mode, such as a tricycle, bicycle and/or quadricycle mode.

Each mode may correspond to one or more drive means. The drive means may be selectable from one or more of: occupant-driven; and/or non-occupant driven. The selectability of the drive means may vary between modes. For example, occupant-driven drive means may not be selectable in the first mode. Occupant-driven or partially occupant-driven may only be selectable in the second mode.

The first mode may comprise a stroller or pushchair configuration. The first mode may comprise a plurality of stroller or pushchair configurations.

In the first mode the apparatus may be driven, powered or propelled by a non-occupant user. In the first mode the apparatus may be configured to be driven, powered or propelled by a non-occupant user. In the first mode the apparatus may be drivable or propelable by a non-occupant user. The non-occupant user may comprise a chaperone, such as an adult accompanying an occupant of the apparatus. The occupant may comprise one or more child/ren to be transported with, on or in the child transportation apparatus. The occupant may comprise only a child or children (e.g. the apparatus may not be suitable for adult occupation and/or adult transportation). The child/ren may comprise a toddler, infant or young child, such as in the age range and/or typical size between around 12 months and around four years old. Additionally, or alternatively, the child/ren may comprise a baby, such as in the age range and/or size from birth to around 12 months. The apparatus may be configured to accommodate a child from birth up to around four years' of age. The occupant may comprise a plurality of children. The occupant may comprise a plurality of children of similar ages or sizes. The occupant may comprise a plurality of children if dissimilar ages or sizes, such as a baby and a toddler. The occupant may comprise a plurality of children simultaneously. The plurality of children may be arranged side-by-side, such as in twin seating. The plurality of children may be arranged longitudinally, such as fore and aft. The plurality of children may be arranged vertically, such as above and below.

In the first mode the apparatus may be solely or entirely driven or drivable by the non-occupant user. In the first mode the apparatus may be solely or entirely driven or propelled by the non-occupant user pushing the apparatus, such as by pushing one or more non-occupant handles or handlebars.

In the first mode, the apparatus may be configured or configurable for the occupant's feet not to contact the ground. In the first mode, the apparatus may be configured or configurable to prevent the occupant's feet touching the ground, at least whilst the occupant is seated in at least one seated position. In the first mode, the apparatus may be configured or configurable for the occupant's feet not to contact the ground for at least one size or age of child; or range of size or age of child. For example, a baby's or toddler under the age of one may be unable to touch the ground in at least some configurations of the first mode. In at least some configurations of the second mode, the occupant's feet may be unable to touch the ground. For example, a baby or toddler under the age of one or two may be unable to touch the ground in at least some configurations of the second mode. The apparatus may be configured to provide a different separation distance between the occupant's feet and the ground in the first compared to the second mode of operation. In the first mode, the separation distance between the occupant's feet and the ground may be greater than separation distance between the occupant's feet and the ground in at least one configuration of the second mode. In at least some configurations of the second mode the occupant's feet may touch the ground, for at least an occupant of a particular size or age.

Alternatively, the occupant's feet may be able to touch the ground in all configurations of at least the second mode for at least a particular age or size of child. For example, a child of age two (or three; or four) or equivalent size or greater may touch the ground with their feet in all configurations of the second mode; and optionally of the first mode.

The second mode may comprise a velocipede configuration. The second mode may comprise a plurality of velocipede configurations.

In the second mode, the apparatus may be at least partially driven or propelled by the occupant. In the second mode, the apparatus may be configured or configurable to be at least partially driven or propelled by the occupant.

In the second mode, the apparatus may be operable for the occupant's feet to contact the ground. In the second mode, the apparatus may be configured or configurable to enable the occupant's feet to contact the ground. For example, the occupant's feet may walk with the apparatus during transportation. The occupant's feet's contact with the ground may at least assist in driving or propelling the apparatus. The occupant's feet's contact with the ground may at least assist in steering the apparatus.

Additionally, or alternatively, in the second mode the apparatus may be operable for the occupant to pedal. In the second mode, the apparatus may be configured or configurable to enable the occupant to pedal. The apparatus may be pedalable in the second mode. The apparatus may comprise a pedal or pair of pedals for occupant pedaling in the second mode. The occupant pedaling may comprise free pedaling, such as not to contribute or detract from drive or propulsion of the apparatus provided by the non-occupant user. Alternatively, the occupant pedaling may at least assist in driving or propelling the apparatus. The occupant pedaling may entirely drive or propel the apparatus. The apparatus in the second mode of operation may be reconfigurable such that the occupant pedaling selectively at least assists in driving or propelling the apparatus or that the occupant pedaling comprises free-pedaling, such as not to contribute (or detract) from drive or propulsion of the apparatus provided by the non-occupant user.

The occupant pedaling may at least assist in steering the apparatus.

In the second mode, the apparatus may be at least partially driven or propelled by the non-occupant user. In the second mode the apparatus may be simultaneously driven the occupant and the non-occupant user, such as simultaneously partially driven by each of the occupant and the non-occupant user. In the second mode the apparatus may be solely or entirely driven or propelled by the non-occupant user. Alternatively, in the second mode the apparatus may be solely or entirely driven or propelled by the non-occupant user pushing the apparatus, such as by pushing one or more non-occupant handles or handlebars. The apparatus may be configured or configurable such that in the second mode the apparatus may be entirely or solely driven or propelled by the occupant and/or that in the second mode the apparatus may be entirely or solely driven or propelled by the non-occupant user. For example the apparatus may be propelled or driven solely by the occupant for a first period and driven solely by the non-occupant user for a second period.

In the first mode the apparatus may be inoperable for the occupant to pedal; or at least configurable to prevent or inhibit occupant pedaling. In at least the first mode, a pedal/s or a pair of pedals may be deactivated or deactivatable. The pedal/s or pair of pedals may be disengagable, such as from a drive system at least in the first mode. For example, the pedal/or pair of pedals may be disengaged from a drive shaft or drive wheel such that no transmission of torque between the pedal/s or pair of pedals and the drive wheel is possible. The pedal/s or pair of pedals may be disengagable, such as from a drive system in at least one configuration of the second mode. The pedal/s or pair of pedals may be at least partially detached or partially detachable at least in the first mode. For example, the detachable pedal or pedals may remain connected or be connectable, such as with a tether, flexible joint, hinge or the like subsequent to disengagement and/or detachment. The pedal/s or pair of pedals may be disengageable and/or at least partially detachable and/or deactivatable in the second mode, such as to assist in providing a walkalong configuration and/or a balance bike/trike or push-bike configuration in the second mode.

The pedal/s or pair of pedals may be directly connected or connectable to a wheel or a shaft of a wheel of the apparatus. For example, the pedal/s or pair of pedals may be connected or connectable to a front wheel/s of the apparatus, the front wheel/s contacting and supporting the apparatus on the ground and providing a rolling contact. Accordingly, when engagedly connected torque may be transferred between the pedal/s or pair of pedals and the front wheel/s so as to propel and/or brake the apparatus. The pedal/s or pair of pedals may be disengaged or deactivated, such as by collapsing the pedal/s or pair of pedals (e.g. inwardly against the front wheel/s). Alternatively, the pedal/s or pair of pedals may be entirely detached or detachable from the shaft or wheel or connection thereto, such as for remote storage (e.g. elsewhere in or on the apparatus, and/or at home). The pedal/s or pair of pedals may be locked or lockable in at least one position, such as corresponding to one or more configurations in the first and/or second modes. For example, the pedal/s or pair of pedals may be lockable in an engaged position to provide a robust transmission of force between the pedal/s or pair of pedals and the occupant/s foot/feet.

The pedal/s or pair/s of pedals may be fixed in the first and/or second modes.

The first mode may comprise a first seating arrangement for the occupant. The first seating arrangement may comprise a stroller or pushchair or pram seating arrangement.

The second mode may comprise a second seating arrangement. The second seating arrangement may comprise a velocipede seating arrangement.

The first and second seating arrangements may be distinct. The first and second seating arrangements may comprise distinct positions of an occupant seat relative to another part of the apparatus. For example, the first seating arrangement may comprise a first seat position relative to a chassis and/or a wheel/s of the apparatus; and the second seating arrangement may comprise a second seat position relative to the chassis and/or the wheel/s of the apparatus, the first and second seat positions being distinct.

Alternatively, the first and second seating arrangements may be the same. For example, the seating arrangement may be fixed in both modes.

The apparatus may be reconfigurable between the first and second modes of operation by adjusting the seating arrangement between the first and second seating arrangements.

The first seating arrangement may comprise a different height position of the seat relative to the second seating arrangement. The first seating arrangement seat height position may comprise an elevated seat height position relative to the second seating arrangement. Alternatively, the first seating arrangement may comprise a lowered seat height position relative to the second seating arrangement seat height position. The seat height position/s may be determined relative to the ground and/or the chassis and/or the wheel/s of the apparatus Alternatively, the first and second seating arrangements may comprise a similar height position of the seat.

The first seating arrangement may comprise a different seat inclination to the second seating arrangement. For example, a first seating arrangement seat position may comprise a rearwardly-inclined seat position and a corresponding second seating arrangement seat position may comprise a more upright or more forwardly-inclined seat position. The rearwardly-inclined seat position may comprise a seat base tilted backwards relative to a horizontal plane. Accordingly, the seat occupant may be facing more upwards in the rearwardly-inclined seat position relative to a non- or less rearwardly-inclined seat position (where, for example, the seat occupant may be facing more forwards relative to the rearwardly-inclined seat position).

Alternatively, the first and second seating arrangements may comprise a similar seat inclination.

The first seating arrangement may comprise a different longitudinal position of the seat relative to the second seating arrangement. The first seating arrangement seat longitudinal position may comprise a rearward or aft seat longitudinal position relative to the second seating arrangement. Alternatively, the first seating arrangement may comprise a forward or fore seat longitudinal position relative to the second seating arrangement seat longitudinal position.

Alternatively, the first and second seating arrangements may comprise a similar longitudinal position of the seat.

Each of the seating arrangement positions may be configured to accommodate the same single child in each of the first and second apparatus modes. The apparatus may be configured to provide at least one first seating arrangement for a first occupant in the first apparatus operation mode and a corresponding at least one second seating arrangement for the same first occupant in the second apparatus operation mode.

The seating arrangement position/s in the first and/or second mode/s may be adjustable. For example, the seating arrangement position/s in the first and/or second mode/s may be adjustable to accommodate the occupant as the occupant grows. Each of the seating arrangements may comprise adjustability to accommodate children of different age or a child as it grows. The adjustability of the/each seating arrangement/s may be configured for adjustment between journeys, such as periodically as a single occupant (e.g. a child always or most commonly transported with the apparatus) grows. Additionally or alternatively at least one of the seating arrangements may be configured for adjustment during a journey. For example, at least in the first mode the angle of inclination of the seat may be adjustable during a single journey, such as increasing the inclination rearwards when the occupant sleeps or wishes to sleep, relax or rest and decreasing the inclination rearwards when the occupant awakes.

The adjustment of the seat arrangement position within a mode may be by the same means as for reconfiguring the seat arrangement between the first and the second modes. For example, the seat arrangement position adjustment within a mode may be by the same pivoting action as to reconfigure the apparatus between the first and second modes of operation (e.g. with less movement).

Alternatively, the adjustment of the seat arrangement position within a mode may be by a different means than for reconfiguring the seat arrangement between the first and the second modes.

The adjustment of the seat position, such as within a mode, may be provided by appropriately extending or retracting a portion of chassis or frame, such as telescopically extending or retracting.

The adjustability of the/each seating arrangement/s may comprise at least one of adjustable seat inclination and/or adjustable seat longitudinal position and/or adjustable seat height position.

Alternatively the seating arrangement when in at least one of the modes of operation may be substantially fixed. For example, when in the second mode of operation, the seat position/s may be non-adjustable.

The seat may comprise a seat base, such as for posterior support of the occupant (e.g. for the occupant to sit upon). The seat may comprise a seat back, such as for lumbar and/or back support of the occupant (e.g. for the occupant to lean back against).

The seat back may be fixed and optionally integral with the seat base. Accordingly, the inclination and longitudinal position and height position of the seat back may be reconfigurable and/or adjustable with the seat base.

Alternatively, the seat back may be movable relative to the seat base. For example, the seat back may be pivotally or hingedly connected to the seat base, such that an angle between the seat back and the seat base may be variable. Accordingly, adjusting or reconfiguring the inclination for the seat may comprise adjusting or reconfiguring the inclination of the seat base and/or the seat back. The seat back and the seat base may be provided such that the seat base is movable in height and/or longitudinal position relative to the seat back. For example, the seat back may be extendable rearwards relative to the seat base to accommodate a larger child (e.g. as a main occupant grows, such as from birth). The seat back and the seat base may be discrete.

The seat back and the seat base may be linked or linkable such that the seat back and seat base may be reconfigurable and/or adjustable as a single unit or element, such as at least during reconfiguration between the first and second modes.

The seat may include a seat base. The seat base may be inclined with respect to a plane perpendicular to a ground-engaging portion of the apparatus in the first mode. The seat base may be substantially rectangular. The seat may be configured to inhibit pedaling in the first mode. The seat may be configured such that the occupant is located further back in the seat base in the first mode than in the second mode. The seat base may have a length which is reduced in the second mode.

The apparatus may be reconfigurable between the first and second modes of operation by adjusting an occupant handle/s or handlebar/s.

The occupant handle/s or handlebar/s may be provided in a first position in the first mode and in a second position in the second mode. The occupant handle/s or handlebar/s first position may comprise an inactive position. The occupant handle/s or handlebar/s second position may comprise an active position.

The apparatus may be reconfigurable between the first and second modes of operation by adjusting an occupant footrest.

The occupant footrest may be provided in a first position in the first mode and in a second position in the second mode. The occupant footrest first position may comprise an active position. The occupant footrest second position may comprise an inactive position.

The apparatus may be reconfigurable between the first and second modes without removing the occupant or needing to remove the occupant from the seat. The apparatus may be reconfigurable between the first and second modes with the occupant in the seat during reconfiguration. The apparatus may be reconfigurable from the first mode to the second mode with the occupant in the seat. The apparatus may be reconfigurable from the second mode to the first mode with the occupant in the seat. The apparatus may be reconfigurable between the first and second modes during a single journey or trip. The apparatus may be repeatedly reconfigurable between the first and second modes during a single journey or trip. The apparatus may be reversibly reconfigurable between the first and second modes during a single journey or trip. The apparatus may be endlessly reconfigurable between the first and second modes during a single journey or trip. The apparatus may be reconfigurable between the first and second modes without waking a sleeping occupant.

The reconfigurability and/or adjustability may be guided. The reconfigurability and/or adjustability may be manual. Additionally, or alternatively the reconfigurability and/or adjustability may be at least semi-automatic or semi-automised, or fully automatic. The reconfigurability and/or adjustability may be assisted. The apparatus may be reconfigurable between the first and second modes and/or adjustable within the/each mode/s using one or more of: lever/s, leverage, spring/s, linear piston/s, hydraulics, damper/s, guide rail/s, hinge/s, pivot/s, chain/s, belt/s or the like. For example, at least a portion of the weight of the seat and/or the occupant may be borne or compensated by a compensation system, such as with one or more of: a pneumatic or hydraulic piston and/or by a spring, such as a leaf spring. The damper/s may comprise a rotation or rotary oil damper, such as for a pivot or joint or inclination adjustment or reconfiguration (e.g. between the first and second seating arrangements and/or for adjustment between the seat base and seat back). The piston/s may comprise a linear piston and/or a rotary piston.

The apparatus may be reconfigurable, such as reconfigurable between the first and second modes, and/or adjustable substantially without tools. The apparatus may be reconfigurable and/or adjustable entirely without tools.

The apparatus may be reconfigurable, such as reconfigurable between the first and second modes, without adding and/or without removing any portion/s of the apparatus.

Alternatively, one or more portion/s of the apparatus may be added or removed during reconfiguration, such as reconfigurable between the first and second modes. For example a portion of the seat may be added or removed during reconfiguration from the first mode to the second mode (e.g. a smaller or bespoke bicycle seat may replace a larger or pram/stroller seat during reconfiguration from the first to the second mode and/or an occupant handlebar may be removed during reconfiguration from the second mode to the first mode).

The apparatus may be reconfigurable to a plurality of configurations at least in the second mode. The apparatus may be reconfigurable to a walkalong configuration and/or a free-pedaling velocipede configuration and/or a powered or engaged pedaling velocipede configuration and/or an independent velocipede configuration.

In the walkalong configuration the pedal/s or pair of pedals may be disengaged and/or at least partially detached and/or deactivated. In the walkalong configuration the apparatus may be propellable or propelled by the occupant and/or by the non-occupant user, such as by the non-occupant user handle/s or handlebars.

In the free-pedaling velocipede configuration the pedal/s or pair of pedals may be disengaged and/or deactivated. In the free-pedaling velocipede configuration the pedal/s or pair of pedals may be attached. In the free-pedaling velocipede configuration the apparatus may be propellable or propelled by the non-occupant user, such as by pushing of the non-occupant user handle/s or handlebars.

In the powered or engaged pedaling velocipede configuration the pedal/s or pair of pedals may be engaged and/or activated and/or attached. In the powered or engaged pedaling velocipede configuration the apparatus may be propelled or propellable by the occupant and/or by the non-occupant user, such as by the non-occupant user handle/s or handlebars.

In the independent velocipede configuration the pedal/s or pair of pedals may be engaged and/or activated and/or attached. In the independent velocipede configuration the apparatus may be propelled or propellable by the occupant and/or by the non-occupant user, such as by the non-occupant user handle/s or handlebars.

In the first mode, the pedal/s or pair/s of pedals may be concealed or at least more concealed or discrete than in at least one configuration of the second mode.

Alternatively, the pedal/s or pair/s of pedals may be fixed.

The apparatus may comprise the same number of wheels in each mode.

Additionally, or alternatively the apparatus may comprise a different number of wheels in one mode. For example in at least one configuration of the second mode, the apparatus may comprise a different number of wheels from the apparatus in at least one configuration of the first mode.

The apparatus may comprise three wheels in the first mode. Alternatively, the apparatus may comprise four wheels in the first mode.

The apparatus may comprise three wheels in the second mode. Additionally or alternatively, the apparatus may comprise four wheels in the second mode. Additionally or alternatively, the apparatus may comprise two wheels in the second mode.

The apparatus may comprise the same number of wheels in each configuration. The apparatus may comprise three wheels in each configuration. The apparatus may comprise four wheels in each configuration.

Alternatively, the apparatus may comprise a different number of wheels in at least one configuration. The apparatus may comprise at least three wheels in at least one configuration. The apparatus may comprise at least four wheels in at least one configuration. The apparatus may comprise at least two wheels in at least one configuration. The apparatus may comprise three wheels in one configuration and four wheels in another configuration. The apparatus may comprise three wheels in one configuration and two wheels in another or yet another configuration.

In the walkalong configuration the apparatus may comprise two wheels. The apparatus may comprise a balance bike configuration. Alternatively in the walkalong configuration the apparatus may comprise three wheels. The apparatus may comprise a balance trike or walkalong trike configuration. Alternatively in the walkalong configuration the apparatus may comprise four wheels. The apparatus may be selectively reconfigurable between two or more of the walkalong configurations.

The apparatus may comprise the occupant footrest, at least in the first mode.

The apparatus may comprise the occupant handle/s or handlebars, at least in the second mode.

The occupant handle/s or handlebars may be reconfigurable from the second mode to provide the occupant footrest in the first mode. The apparatus may be reconfigurable such that the occupant footrest of the second mode provides the occupant handle/s or handlebars of the first mode. The apparatus may be configured or configurable to protect a handgrip portion of the handle/s or handlebars when used as the occupant footrest in the first configuration. The handgrip portion/s of the handle/s or handlebar/s may be adjustable so as to be protected from the occupant's feet when used as an occupant footrest in the first mode. For example, the handgrip portion/s may be retractable within an adjacent sleeve or cover portion/s of the handle/s or handlebars.

The apparatus may comprise a sleeve or cover for protecting the handgrip portion/s when the handle/s or handlebars is/are used as an occupant footrest. The sleeve or cover may be adjustable or may be automatically activated/deactivated during reconfiguration between the first and second modes. The sleeve or cover may comprise one or more substantially planar surfaces. The sleeve or cover may comprise one or more display portions. The display portion may comprise a graphic or text or the like. For example, the display portion may comprise a licence or number plate, such as a personalised name or symbol or the like (e.g. similar to a vehicle registration or licence plate).

The occupant handlebars may be variable in position and/or configuration. For example, the occupant handle/s or handlebars may be lowered or lowerable for use as the occupant footrest. The occupant handlebars may be variable using similar means as the seating arrangement adjustment or reconfiguration; such as using one or more of: lever/s, leverage, spring/s, linear piston/s, hydraulics, damper/s, guide rail/s, hinge/s, pivot/s, chain/s, belt/s or the like. The occupant handlebars may be variable using the same means as the seating arrangement adjustment or reconfiguration. For example, the variation of the occupant handle/s or handlebars may be linked to the seating arrangement adjustment or reconfiguration.

The apparatus may be steered or steerable by the non-occupant handle/s or handlebar/s and/or by the occupant handle/s or handlebars. The steering may be the same in all modes and configurations. For example, the steering may be by the non-occupant user only in all modes and configurations. Alternatively, the steering may be different in at least two different configurations and optionally different between the first and the second modes. For example, the steering may be by the non-occupant user only in the first mode and by the occupant and/or the non-occupant user in the second mode. The apparatus may be configurable such that the apparatus is steerable by the non-occupant user at all times when being pushed by the non-occupant user. For example, the occupant handle/s or handlebars may be disengaged from any of the apparatus' ground-engaging wheels. One or more of the apparatus' ground-engaging wheel/s may be of fixed orientation relative to the chassis, such as fixed straight so as to always run parallel to the longitudinal orientation of the apparatus. For example, a rear and/or front wheel or pair/s of wheels may be fixed to always rotate in a straight direction parallel to a longitudinal orientation of the apparatus (e.g. in the direction of intended travel). In addition, or alternatively, one or more of the apparatus' ground-engaging wheels may be of variable or steerable orientation relative to the chassis, so as to steer the apparatus. For example, a front or pair of front wheels may be steerable about a non-horizontal axis so as to allow the wheel or pair of wheel to turn relative to the longitudinal orientation of the apparatus. The non-horizontal axis may be inclined rearwards, closer to vertical than to horizontal, so as to allow the wheel or pair of wheels to be generally following in the direction of travel.

The non-occupant handle/s or handlebars may be adjustable. The non-occupant handlebars may be adjustable to accommodate a comfort of the non-occupant user, such as may be associated with different non-occupant users of different height or arm length or the like.

The non-occupant user handle/s or handlebar/s may be adjustable for different modes and/or configurations. For example, in the independent velocipede configuration, the non-occupant user handle/s or handlebar/s may be collapsible, such as collapsible to a lowered position (e.g. proximal to or below an upper portion of the seat). The non-occupant user handle/s or handlebar/s may be telescopically and/or hingedly collapsible. In the independent velocipede configuration, the non-occupant user handle/s or handlebar/s may be removable or detachable; such as for storage (e.g. elsewhere in or on the apparatus or at home) or for carrying by the non-occupant user.

The seat may comprise straps or fasteners. The apparatus may be reconfigurable between the modes and/or configurations without unstrapping or unfastening the occupant.

The seat may be removable. The apparatus may be configured to receive a plurality of seats, such as from an array of seats (e.g. of different sizes and/or types and/or styles). The seat may be removable for replacement, repair, cleaning. The seat may be removable for use in other applications. For example, the apparatus may be configured to receive a system seat or seats, such as an interchangeable car seat and/or interchangeable carrycot and/or interchangeable stroller or pram seat or the like. The apparatus may be configured to receive an additional seat, such as for an additional child or baby. For example, the apparatus may be configured to receive an additional seat to provide a plurality of seats corresponding to the plurality of children occupants.

Alternatively, the seat may be non-removable, such as permanently attached to the chassis or frame.

The child transportation apparatus may be configured to allow the non-occupant to override the steering by the occupant. The apparatus may include at least one omni wheel. A front wheel of the apparatus may comprise an omni wheel. The omni wheel may have one more pedals coupled to the omni wheel. The seat may comprise straps or fasteners. The apparatus may be reconfigurable between the modes and/or configurations without unstrapping or unfastening the occupant.

The apparatus may be collapsible or foldable when not in use, such as for compact storage and/or transportation (e.g. in an automotive vehicle). The apparatus may be collapsible or foldable with a single hand by the non-occupant user.

The apparatus may comprise one or more integrated accessory holder/s.

The accessory holder may be fixed relative to a portion of the apparatus, such as the frame or chassis and/or the occupant handle/s or handlebars. The integrated accessory holder may be integral or integrally-formed with the portion of the apparatus.

The accessory holder may be non-removably attached to the apparatus, such as permanently fixed to the portion of the apparatus.

The accessory holder may be reconfigurable between an active configuration in which the accessory holder can hold the appropriate accessory and an inactive configuration in which the accessory holder is stored for non-use. The accessory holder may be reconfigurable between the active and inactive configurations by one or more: collapsing or expanding; extending or retracting; pivoting; sliding; or the like. The inactive configuration may provide for a more compact storage configuration, for the accessory holder/s and optionally the apparatus as such.

The accessory holder may be for holding a non-occupant accessory. The accessory holder may be for exclusively holding a non-occupant accessory.

The accessory holder may be for holding an occupant accessory. The accessory holder may be for exclusively holding an occupant accessory.

The accessory holder/s may be for holding a non-occupant accessory and/or an occupant accessory.

The accessory holder/s may comprise one or more of: a drink holder; a bag holder; an umbrella holder or stand; an umbrella storage holder; a parasol holder or stand; and/or a parasol storage holder.

The non-occupant user handle/s or handlebars may comprise an integrated drink holder, such as to enable the non-occupant user to safely store a drink. The drink holder may be usable by the occupant when the apparatus is in an independent velocipede configuration.

The non-occupant user handle/s or handlebars may comprise one or more integrated bag holders to enable for belongings to be hung, such as hooks, clasps, clips or the like.

The integrated accessory holder may be positioned on the non-occupant handle/s or handlebars. A plurality of the integrated accessory holders may be distributed along a portion of the non-occupant handle/s or handlebars. The plurality of integrated accessory holders may comprise one or more of the different types of accessory holder (e.g. a single drink holder and a plurality of bag holder). Alternatively, the plurality of integrated accessory holders may comprise a single type of accessory holder.

When in the first mode, the apparatus may be configured such that there is no restriction between an occupant's legs. For example, there may be no restrictions otherwise commonly associated with bicycles or tricycles or the like, such as bars or framework or chassis.

At least in the first mode and optionally in at least some configurations of the second mode, the apparatus may be provided with or at least suitable for receiving a cosy-toes or blanket for covering the occupant's feet and/or legs (at least) together; and/or a raincover.

The apparatus may comprise one or more brakes. The one or more brakes may be occupant activated and/or non-occupant user activated. The one or more brakes may be selectively deactivated so as to prevent braking ability. The one or more brakes may be selectively deactivated so as to prevent braking ability in one or more of the modes or configurations. For example, an occupant brake may be deactivated in all configurations other than independent velocipede configurations.

The orientation of the occupant support device and/or occupant thereof may be modified and/or adjusted relative to the engagement portion of the frame. For example, the occupant support device may be oriented towards the direction of travel or towards a non-occupant or user. A non-occupant or user of the apparatus is a person who pushes and/or steers the apparatus but is not an occupant of the apparatus. For example, in embodiments in which the apparatus is a child transportation apparatus, a non-occupant or user is the person providing childcare to the occupant of the apparatus, which may be a child or children. In this way, in addition to the various modes of travel provided by the device, it is also possible to vary the orientation of the occupant within the apparatus. Therefore, at least some embodiments of the apparatus may comprise up to six products in one, for example by changing the orientation of the occupant support device within the frame.

According to a second aspect there is provided a child transportation apparatus, the child transportation apparatus being reconfigurable between at least two modes of operation, a first mode of operation comprising a stroller, pushchair or perambulation (pram) mode; and a second mode comprising a velocipede mode; wherein the apparatus includes a seat for the occupant, and pedals for occupant pedaling in the second mode, and wherein the apparatus is reconfigurable between the first and second modes of operation by:

adjusting the height and/or inclination of the seat by moving the seat relative to the pedals; and/or adjusting an occupant handle/s or handlebar/s between an inactive position in the first mode and in an active position in the second mode and/or deactivating and/or disengaging the pedals.

The child transportation apparatus may, in the first mode, be configured or configurable such that the occupant's feet at least one of not contact the ground or not be able to operate the pedals, for at least one size or age of child.

According to a third aspect there is provided a method of transporting a child with a child transportation apparatus.

The method may comprise reconfiguring the apparatus between at least two modes.

A first mode of operation may comprise a stroller, pushchair or perambulation (pram) mode. A second mode may comprise a velocipede mode. The first mode may comprise a first seating arrangement for an occupant and the second mode may comprise a second seating arrangement, the first and second seating arrangements being distinct.

The method may comprise reconfiguring the apparatus between the at least two modes during a single trip, journey and/or day. The method may comprise reconfiguring the apparatus between the at least two modes for a single child. The method may comprise reconfiguring the apparatus between the at least two modes for the same child at the same age.

The method may comprise reconfiguring without removing and/or disturbing an occupant.

It will be understood that features listed in connection with one aspect may be equally applicable to another aspect and have not been repeated, for brevity.

The invention includes one or more corresponding aspects, embodiments or features in isolation or in various combinations whether or not specifically stated (including claimed) in that combination or in isolation. For example, it will readily be appreciated that features recited as optional with respect to any aspect may be applicable with respect to any other aspect(s) without the need to explicitly and unnecessarily list those various combinations and permutations here (e.g. the child transportation apparatus of one aspect may comprise features of any other aspect). Optional features as recited in respect of a method may be additionally applicable to an apparatus; and vice versa. For example, an apparatus may be configured to perform any of the steps or functions of a method.

In addition, corresponding means for performing one or more of the discussed functions are also within the present disclosure.

It will be appreciated that one or more embodiments/aspects may be useful in the transportation of a child or children.

The above summary is intended to be merely exemplary and non-limiting.

BRIEF DESCRIPTION OF THE DRAWINGS

Embodiments will now be described, by way of example, with reference to the accompanying drawings, in which:

FIG. 3 shows a schematic representation of another transportation apparatus in a first mode of operation;

FIG. 4 shows a seat of the apparatus of FIG. 3 in three selectable positions;

FIG. 12 shows a portion of a transportation apparatus according to another embodiment of the present invention;

FIG. 13 shows the portion of the transportation apparatus of FIG. 12 with an accessory holder in active position;

FIG. 14 shows a portion of a transportation apparatus according to another embodiment of the present invention;

FIG. 15 shows the portion of the transportation apparatus of FIG. 14 with an accessory holder in active position;

FIG. 16 which shows a portion of a transportation apparatus according to another embodiment of the present invention FIG. 17 shows a portion of a transportation apparatus according to another embodiment of the present invention;

FIG. 18 shows the portion of the transportation apparatus of FIG. 17 with an accessory holder in active position;

FIG. 19 shows a portion of a transportation apparatus according to another embodiment of the present invention; and FIG. 20 shows the portion of the transportation apparatus of FIG. 19 with an accessory holder in active position;

FIG. 21 shows a schematic representation of another transportation apparatus in a first mode of operation;

FIG. 22 shows the apparatus of FIG. 21 in a second mode of operation in a first configuration;

FIG. 23 shows a schematic representation of another transportation apparatus in a first configuration of a second mode of operation;

DETAILED DESCRIPTION OF THE DRAWINGS

Figure 1:
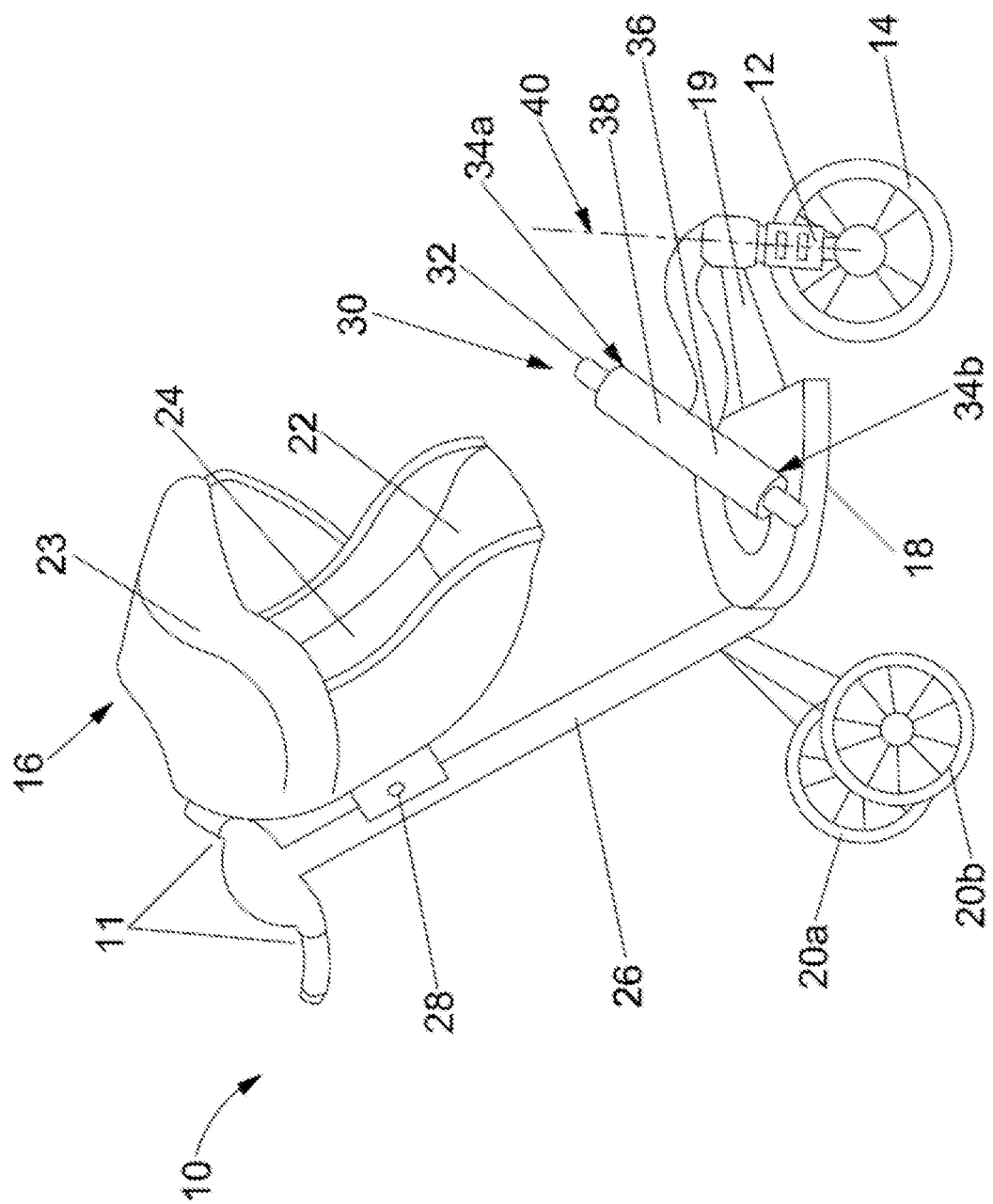
FIG. 1 shows a schematic representation of a transportation apparatus in a first mode of operation.
Figure 2:
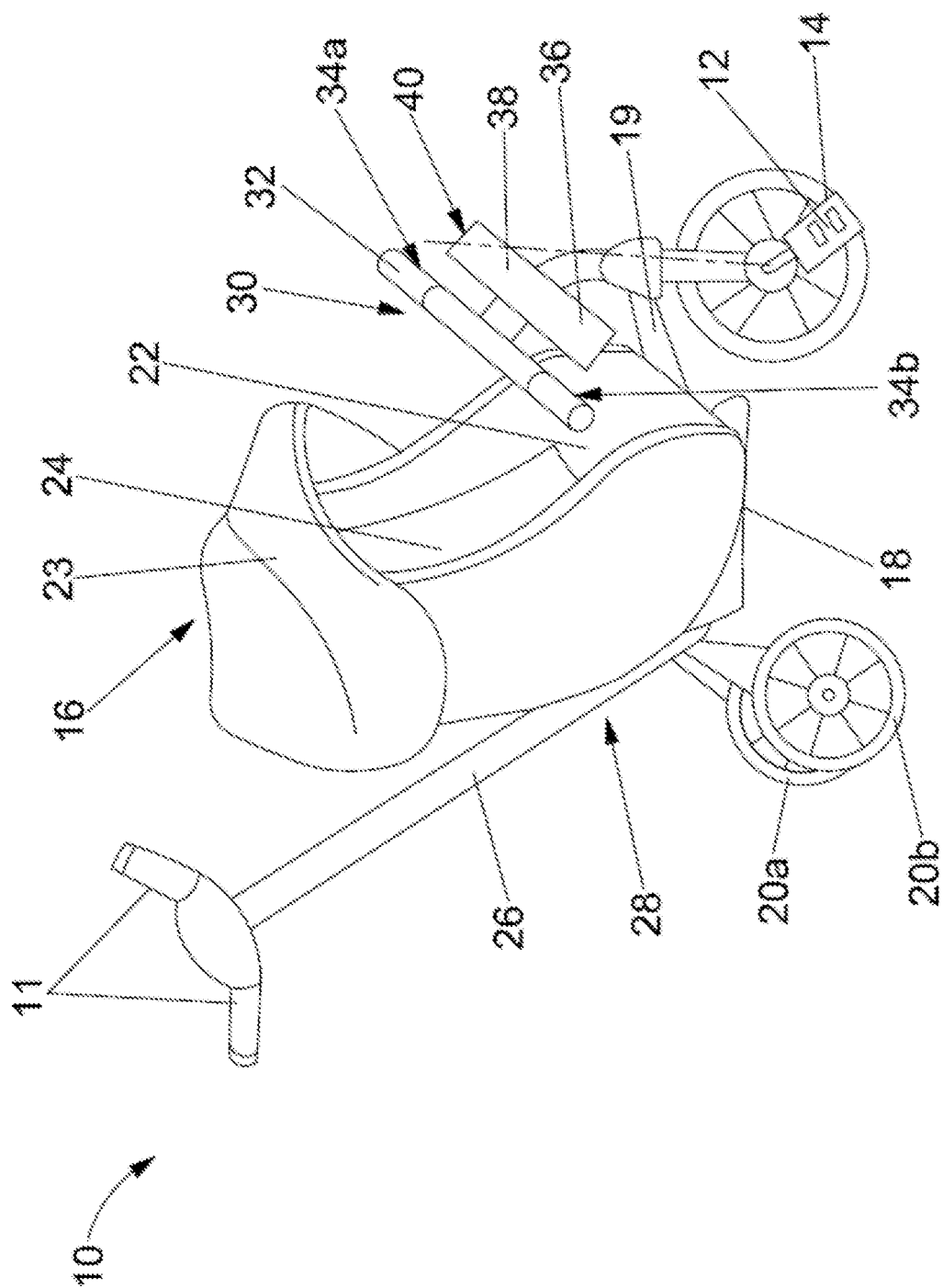
FIG. 2 shows the apparatus of FIG. 1 in a second mode of operation.

Reference is first made to FIGS. 1 and 2 which show a child transportation apparatus 10 according to a first embodiment of the present invention.

The child transportation apparatus 10 is reconfigurable between at least two modes of operation. There is at least some overlap between the different modes of transport.

The child transportation apparatus 10 comprises a stroller, push-chair or perambulator (pram). Here, additionally the child transportation apparatus 10 comprises a velocipede, such as a tricycle, bicycle and/or quadricycle. A first mode of operation comprises a stroller, push-chair or perambulation (pram) mode. A second mode comprises a velocipede mode, such as a push-bike, walkalong, balance bike, trike, tricycle, bicycle and/or quadricycle mode.

The first mode comprises a first seating arrangement for the occupant. The first seating arrangement comprises a stroller or pushchair or pram seating arrangement. The second mode comprises a second seating arrangement. The second seating arrangement comprises a velocipede seating arrangement. The first and second seating arrangements are distinct.

Each mode corresponds to one or more drive means. The drive means is selectable from one or more of: occupant-driven; and/or non-occupant driven. The selectability of the drive means may vary between modes. For example, occupant-driven drive means is not be selectable in the first mode as shown in FIG. 1. Occupant-driven or partially occupant-driven is only be selectable in the second mode shown in FIG. 2.

The first mode comprises a stroller or pushchair or pram configuration, as shown in FIG. 1. In the first mode the apparatus 10 is driven, powered or propelled by a non-occupant user. The non-occupant user comprises a chaperone, such as an adult accompanying an occupant of the apparatus 10. Here, the occupant comprises a child (not shown) to be transported with, on or in the child transportation apparatus 10. The apparatus 10 may not be suitable for adult occupation and/or adult transportation. The child comprises a toddler, infant or young child, such as in the age range and/or typical size between around birth or around 12 months and around four years old. In the first mode the apparatus 10 is solely or entirely driven or propelled by the non-occupant user pushing the apparatus 10, such as by pushing the non-occupant handles or handlebars. It will be appreciated that in at least some embodiments, for transporting a child from birth, or of baby size or age,—additional seating, such as a car seat etc for infant, can be attached when in the first and/or second modes.

In the first mode, the apparatus 10 is configured for the occupant's feet not to contact the ground. In the first mode, the apparatus 10 is configured to prevent the occupant's feet touching the ground, at least whilst the occupant is seated. Furthermore, in the first mode, the apparatus 10 is configured such that the child's feet are clear of the pedals, or at least unable to pedal the vehicle. In the embodiment of FIGS. 1 and 2, this is achieved in two distinct ways. Firstly, in the first seating arrangement of the first mode, the seat 16 (and therefore the child occupant) is at a greater height than for the second mode. Secondly, the pedals 12 are inoperable and unavailable to the child in the first mode. Both of these features are described in more detail below.

There are other means for ensuring the child's feet are clear of the pedals and/or the ground. In an alternative embodiment, rather than raising the seat in the first mode, the inclination of the seat is changed. Specifically, the whole seat including the seat base is reclined when in the first mode such that the child's legs are pivoted upwards and away from the pedals. Also, the seat is configured such that the child sits further back in the seat in this mode and the seat base is substantially rectangular (rather than saddle shaped). The seat base therefore prevents a pedaling action by the child.

In a second alternative embodiment, the pedals 12 may simply be disengaged with the drive means when in the first mode.

The second mode comprises a velocipede configuration, as shown in FIG. 2. In the second mode, the apparatus 10 is at least partially driven or propelled by the occupant. In the second mode, the apparatus 10 is operable for the occupant's feet to contact the ground. In the second mode, the apparatus 10 is configured to enable the occupant's feet to contact the ground. For example, the occupant's feet may walk with the apparatus 10 during transportation. The occupant's feet's contact with the ground may at least assist in driving or propelling the apparatus 10. The occupant's feet's contact with the ground may at times, if desired, at least assist in steering the apparatus 10.

Additionally, here, in the second mode the apparatus 10 is operable for the occupant to pedal. In the second mode, the apparatus 10 is configured or configurable to enable the occupant to pedal. The apparatus 10 comprises a pair of pedals 12 (one visible in the figures) for occupant pedaling in the second mode. Here, the occupant pedaling at least assists in driving or propelling the apparatus 10. Dependent upon any pushing by the non-occupant user, the occupant pedaling may entirely drive or propel the apparatus 10. In addition, here, the occupant pedaling may at least assist in steering the apparatus 10.

In the second mode, the apparatus 10 can be at least partially driven or propelled by the non-occupant user. In the second mode the apparatus 10 can be simultaneously driven by the occupant and the non-occupant user, such as simultaneously partially driven by each of the occupant and the non-occupant user. Alternatively, when the occupant becomes tired or disinterested, in the second mode the apparatus 10 can be solely or entirely driven or propelled by the non-occupant user, such as by pushing one or more non-occupant handles or handlebars. For example the apparatus 10 is propelled or driven solely by the occupant for a first period and driven solely by the non-occupant user for a second period. If the child gets tired in the second mode, the apparatus 10 can be transferred back to the first mode at any point without removing or unfastening the child. Alternatively if the child becomes active in the first mode, the apparatus 10 can be transformed to the second mode without removing or unfastening the child. This is achieved with no additional parts being added or removed.

However, it is desirable that, for safety reasons, the adult has the ability to adjust, or override, the steering by the child. This can be achieved in an alternative embodiment by coupling the non-occupant handlebar 11 to the front wheel (which largely determines the steering direction). However, this requires a complex linkage arrangement.

In a second alternative embodiment, the vehicle 10 includes omni wheel/s. These are wheels with small discs around the circumference which are perpendicular to the turning direction. The effect is that the wheel can be driven with full force, but will also slide laterally with great ease. The main advantage of this is that the adult can operate the non-occupant handles 11 provided at the rear of the vehicle to override the steering of the child if necessary. It also helps to steer the vehicle 10 around corners. Omni wheels are typically used in applications such as robotics. However, the inventor has recognised their usefulness in the specific application of allowing an adult to override poor or dangerous steering by a child.

In this second alternative embodiment, the pedals are directly connected to the omni wheel, although other configurations are possible. Also, the pedals are foldable. In the second mode, the pedals can be folded into a recess provided in the omni wheel. Therefore, the pedals are deactivated in the sense that they cannot be operated. Alternatively, the pedals could be disengagable from the wheel in both the first and second modes to allow freewheeling.

In the first mode the apparatus 10 is inoperable for the occupant to pedal. In at least the first mode, a pedal/s or a pair of pedals 12 is deactivated or deactivatable, as can be seen in FIG. 1. Here, the pair of pedals 12 is disengageable and/or at least partially detachable and/or deactivatable in the second mode (not shown), such as to assist in providing a walkalong configuration and/or a balance bike/trike configuration in the second mode (not shown).

Here, the pair of pedals 12 is directly connected to a front wheel 14 of the apparatus 10, the front wheel 14 contacting and supporting the apparatus 10 on the ground and providing a rolling contact. Accordingly, when engagedly connected, torque is transferred between the pair of pedals 12 and the front wheel 14 so as to propel or brake the apparatus 10. The pair of pedals 12 is disengaged or deactivated by collapsing folding, or flipping the pair of pedals 12 (e.g. inwardly against the front wheel 14), as shown upwardly in FIG. 1. In alternative embodiments (see, for example, FIGS. 21 and 23), the pair of pedals 12 is entirely detached or detachable from the shaft or wheel or connection thereto, such as for remote storage (e.g. elsewhere in or on the apparatus 10, and/or at home). The pair of pedals 12 is lockable in an engaged position to provide a robust transmission of force between the pair of pedals 12 and the occupant/s foot/feet.

The first and second seating arrangements comprise distinct positions of an occupant seat 16 relative to another part of the apparatus 10. Here, the first seating arrangement comprises a first seat position relative to a chassis 18 and both the rear wheels 20a, 20b and the front wheel 14 of the apparatus 10 as shown in FIG. 1; and the second seating arrangement comprises a second seat position relative to the chassis 18 and both the rear wheels 20a, 20b and the front wheel 14 as shown in FIG. 2, the first and second seat positions being distinct.

Figure 10:
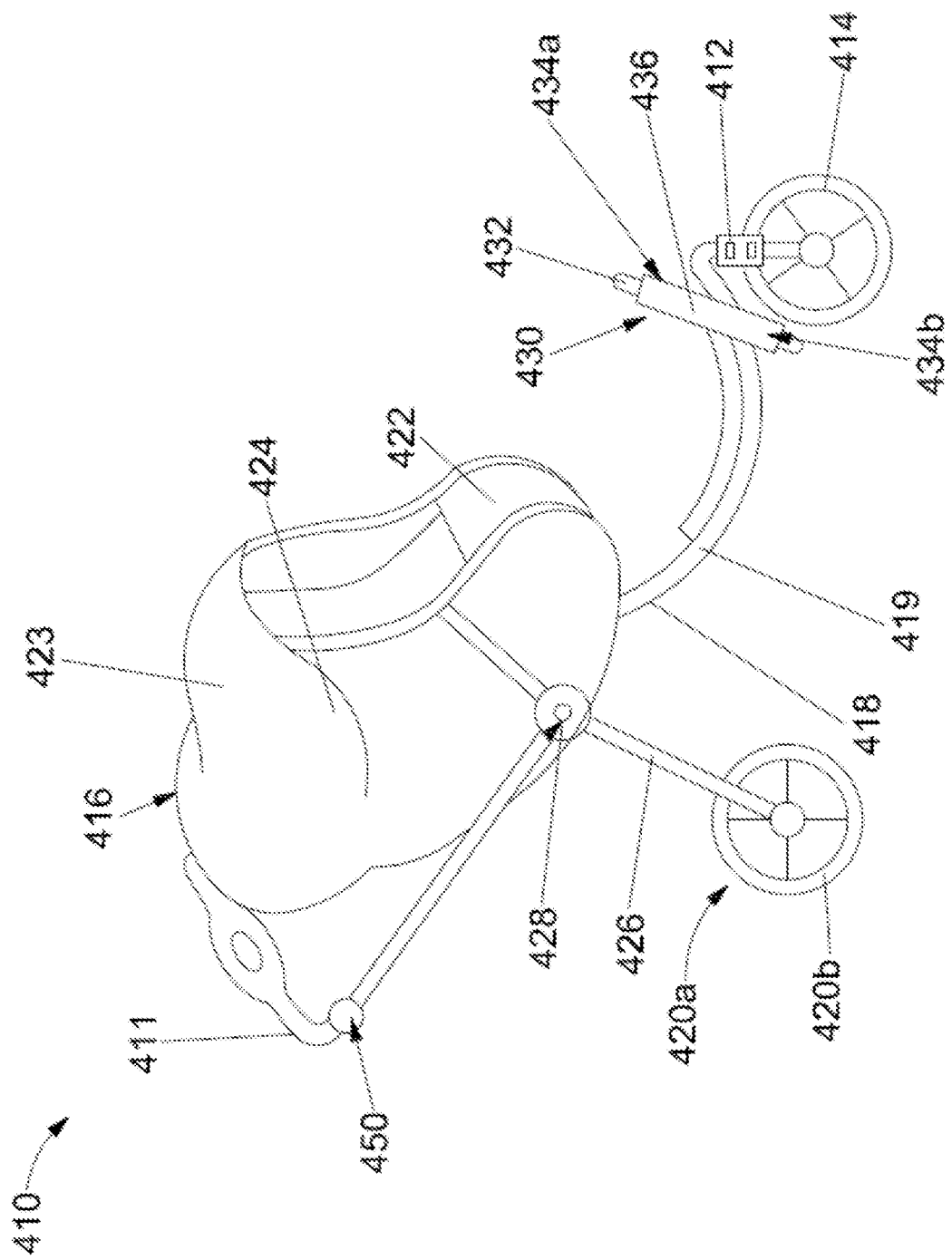
FIG. 10 shows a schematic representation of another transportation apparatus in a first mode of operation.
Figure 11:
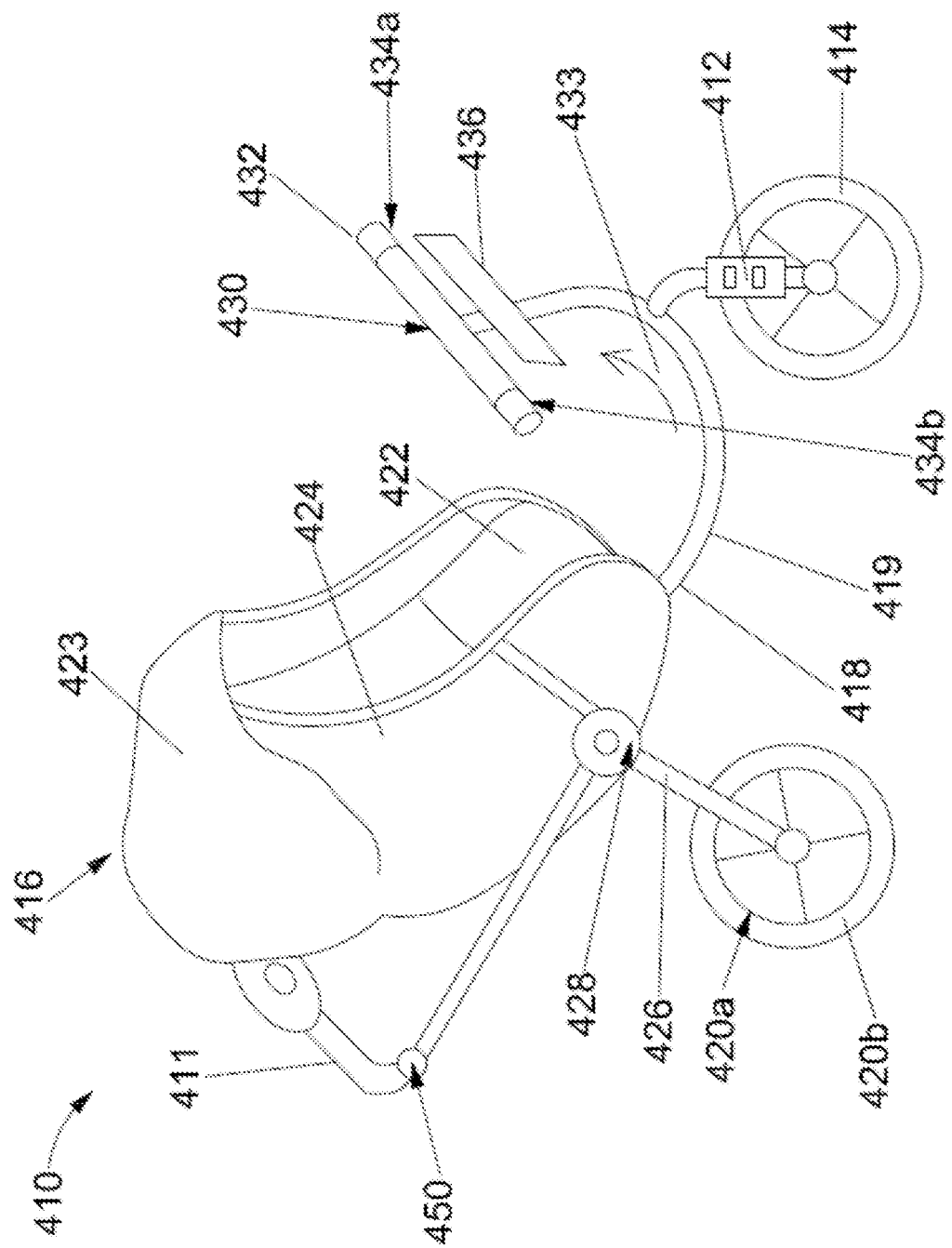
FIG. 11 shows the apparatus of FIG. 10 in a second mode of operation in a first configuration.

The first seating arrangement comprises a different height position of the seat 16 relative to the second seating arrangement. The first seating arrangement seat height position comprises an elevated seat height position relative to the second seating arrangement. As explained above, this ensures that the child's feet are clear of the pedals and the ground. In alternative embodiments (such as shown in FIGS. 10 and 11), the first seating arrangement comprises a lowered or similar seat height position relative to the second seating arrangement seat height position. The seat height positions can be determined relative to the ground and/or the chassis 18 and/or the wheel/s of the apparatus 10.

Here, the first and second seating arrangements as shown in FIGS. 1 and 2 respectively, comprise a similar seat inclination.

The first seating arrangement comprises a different longitudinal position of the seat 16 relative to the second seating arrangement. The first seating arrangement seat longitudinal position comprises a rearward or aft seat longitudinal position relative to the second seating arrangement. This is another means of ensuring that the child's feet are clear of the pedals. In alternative embodiments (not shown), the first seating arrangement comprises a similar or a forward or fore seat longitudinal position relative to the second seating arrangement seat longitudinal position.

Each of the seating arrangement positions is configured to accommodate the same single child in each of the first and second apparatus 10 modes. The apparatus 10 is configured to provide at least one first seating arrangement for a first occupant in the first apparatus 10 operation mode and a corresponding at least one second seating arrangement for the same first occupant in the second apparatus 10 operation mode.

The seat 16 comprises a seat base 22 22, such as for posterior support of the occupant (e.g. for the occupant to sit upon). The seat 16 comprises a seat back 24 24, such as for lumbar and/or back support of the occupant (e.g. for the occupant to lean back against). Here, the seat back 24 is fixed and integral with the seat base 22. Accordingly, the inclination and longitudinal position and height position of the seat back 24 is reconfigurable and/or adjustable together with the seat base 22. The seat back 24 and the seat base 22 are linked such that the seat back 24 and seat base 22 are reconfigurable and adjustable as a single unit or element, such as during reconfiguration between the first and second modes. In other embodiments (not shown), the seat back and seat base are not connected meaning the seat back can be adjusted without disturbing the positioning of the seat base.

The apparatus 10 is reconfigurable between the first and second modes without removing the occupant or needing to remove the occupant from the seat or unfastening the straps/belt (not shown). The apparatus 10 is reconfigurable between the first and second modes with the occupant in the seat 16 during reconfiguration. The apparatus 10 is reconfigurable from the first mode to the second mode with the occupant in the seat. The apparatus 10 is reconfigurable from the second mode to the first mode with the occupant in the seat. The apparatus 10 is reconfigurable between the first and second modes during a single journey or trip. The apparatus 10 is repeatedly reconfigurable between the first and second modes during a single journey or trip. The apparatus 10 is reconfigurable, for example reversibly reconfigurable, between the first and second modes during a single journey or trip. The apparatus 10 is endlessly reconfigurable between the first and second modes during a single journey or trip. The apparatus 10 is reconfigurable between the first and second modes without waking a sleeping occupant.

The reconfigurability and/or adjustability is guided. Here, the reconfigurability and/or adjustability is manual and assisted. The apparatus 10 is reconfigurable between the first and second modes and/or adjustable within the/each mode/s using a guide rail 26. At least a portion of the weight of the seat 16 and/or the occupant is borne or compensated by a compensation system, such as here with a piston within the rail 26. The seat 16 is locked in the position of FIG. 1 for the first mode. When it is desired to reconfigure to the second mode of FIG. 2, a lock 28 is released and the seat 16 is gradually lowered into position, controlled by the resistance of the spring forces in the guide rail 26 and the seat 16 optionally locked in the position of FIG. 2. When it is desired to reconfigured from the second mode of FIG. 2 to the first mode of FIG. 1, the lock 28 is unlocked if necessary and the seat 16 is gradually raised into position, assisted by the spring forces in the guide rail 26. In at least some embodiments, the apparatus 10 could be transferred or reconfigured or adjusted with automatic movement such as hydraulics, etc, which is not guided.

It will be appreciated that the apparatus 10 is adjustable to accommodate children of different sizes or a child as it grows by extending or retracting a telescopic portion 19 of a frame of the chassis 18. The apparatus 10 can accommodate multiple children by extending chassis 18, such as to extend the chassis 18 to allow for the attachment of an additional seat.

The apparatus 10 is reconfigurable and adjustable entirely without tools.

The apparatus 10 is reconfigurable at any point during a single trip or journey.

When in the first mode, the apparatus 10 is configured such that there is no restriction between an occupant's legs. For example, there are no restrictions otherwise associated with bicycles or tricycles or the like, such as bars or framework or chassis 18.

The apparatus 10 is reconfigurable to a plurality of configurations at least in the second mode. Here, the apparatus 10 is reconfigurable to a walkalong configuration (not shown) and a powered or engaged pedaling velocipede configuration (FIG. 2) and an independent velocipede configuration (not shown).

In the walkalong configuration (not shown) the pair of pedals 12 is disengaged and deactivated as in FIG. 1; however the seating arrangement is that of FIG. 2. In the walkalong configuration the apparatus 10 is propellable or propelled by the occupant walking (whilst seated) and/or by the non-occupant user, such as by the non-occupant user handle/s or handlebars.

In the powered or engaged pedaling velocipede configuration of FIG. 2 the pair of pedals 12 is engaged and/or activated and/or attached. In the powered or engaged pedaling velocipede configuration the apparatus 10 is propelled or propellable by the occupant and/or by the non-occupant user, such as by the non-occupant user handle/s or handlebars.

In the independent velocipede configuration (not shown) the pair of pedals 12 is engaged and activated and attached. In the independent velocipede configuration the apparatus 10 is propelled or propellable by the occupant, but not by the non-occupant user handle/s or handlebars as these are deactivated in the independent velocipede mode (e.g. by removing or collapsing, such as telescopically, the arm 26 from the chassis 18—although not shown here).

Here, the apparatus 10 comprises the same number of wheels in each mode. Here, the apparatus 10 comprises three wheels in the first and second modes. In alternative embodiments (not shown), the apparatus 10 comprises four wheels in the first mode and optionally the second mode.

The apparatus 10 comprises an occupant footrest 30 in the first mode. The apparatus 10 comprises an occupant handle/s or handlebars 32, at least in the second mode. The occupant handle/s or handlebars 32 is reconfigurable from the second mode to provide the occupant footrest 30 in the first mode. The apparatus 10 is reconfigurable such that the occupant handle/s or handlebars 32 of the second mode provide the occupant footrest 30 of the first mode. The apparatus 10 is configurable to protect handgrip portions 34a, 34b of the occupant handle/s or handlebars 32 when used as the occupant footrest 30 in the first configuration. The apparatus 10 comprises a sleeve or cover 36 for protecting the handgrip portions 34a, 34b when the occupant handle/s or handlebars 32 is/are used as an occupant footrest 30. The sleeve or cover 36 is adjustable during reconfiguration between the first and second modes. The sleeve or cover 36 comprises a substantially planar surface 38. Here the planar surface provides a display portion for graphic or text or the like (not shown), such as a personalised name or symbol or the like (e.g. similar to a vehicle registration or licence plate).

In alternative embodiments (not shown) the handgrip portions of the occupant handle/s or handlebar/s 32 are adjustable so as to be protected from the occupant's feet when used as an occupant footrest 30 in the first mode. For example, the handgrip portions are retractable within an adjacent sleeve or cover portion/s of the occupant handle/s or handlebars 32.

The occupant handlebars 32 are variable in position. For example, the occupant handle/s or handlebars 32 is lowered or lowerable for use as the occupant footrest 30, as shown in FIG. 1. The occupant handlebars 32 is variable here by hinging about a pivot axis.

By this means, the occupant steering means is out of reach or inoperable when the vehicle is in the stroller mode. In an alternative embodiment, the occupant handlebar 32 can be disconnected from the drive. The occupant handlebar 32 may also be configured such that it can be folded away into the body of the vehicle 10. The occupant handlebar 32 may also be telescopically retractable, collapsible, concealable or even removable from the apparatus.

The apparatus 10 is steered or steerable by the non-occupant handle/s or handlebar/s 11 and/or by the occupant handle/s or handlebars 32. Here, the steering is by the non-occupant user only in all modes and configurations.

The apparatus' 10 ground-engaging rear wheels 20a, 20b are of fixed orientation relative to the chassis 18, such as fixed straight so as to always rotate in a straight direction parallel to a longitudinal orientation of the apparatus 10 (e.g. in the direction of intended travel). In addition, the front wheel 14 is steerable about a non-horizontal axis 40 as to allow the wheel to turn relative to the longitudinal orientation of the apparatus 10. The non-horizontal axis is inclined rearwards, closer to vertical than to horizontal, so as to allow the wheel to be generally following in the direction of travel.

The non-occupant handlebars are adjustable in height and position to accommodate a comfort of the non-occupant user, such as is associated with different non-occupant users of different height or arm length or the like. The non-occupant user handle/s or handlebar/s 11 are adjustable for different modes and/or configurations.

Here, the apparatus 10 also comprises an adjustable hood 23.

The apparatus 10 is collapsible or foldable when not in use, such as for compact storage and/or transportation (e.g. in an automotive vehicle) with a single hand by the non-occupant user. Although not shown, in at least some embodiments, the non-occupant user handle/s or handlebars 11 comprises one or more integrated bag holders to enable for belongings to be hung, such as hooks, clasps, clips or the like. Similarly, in at least some embodiments, the non-occupant user handle/s or handlebars 11 comprises an integrated cup holder, such as to enable the non-occupant user to safely store a drink. The cup holder is usable by the occupant when the apparatus 10 is in an independent velocipede configuration. At least in the first mode and optionally in at least some configurations of the second mode, the apparatus 10 is provided with or at least suitable for receiving a cosy-toes or blanket for covering at least the occupant's feet and/or legs together; and/or a raincover. Similarly, although not shown it will be appreciated that, in at least some embodiments, the seat 16 comprises straps or fasteners. The apparatus 10 is reconfigurable between the modes and/or configurations without unstrapping or unfastening the occupant.

Figure 5:
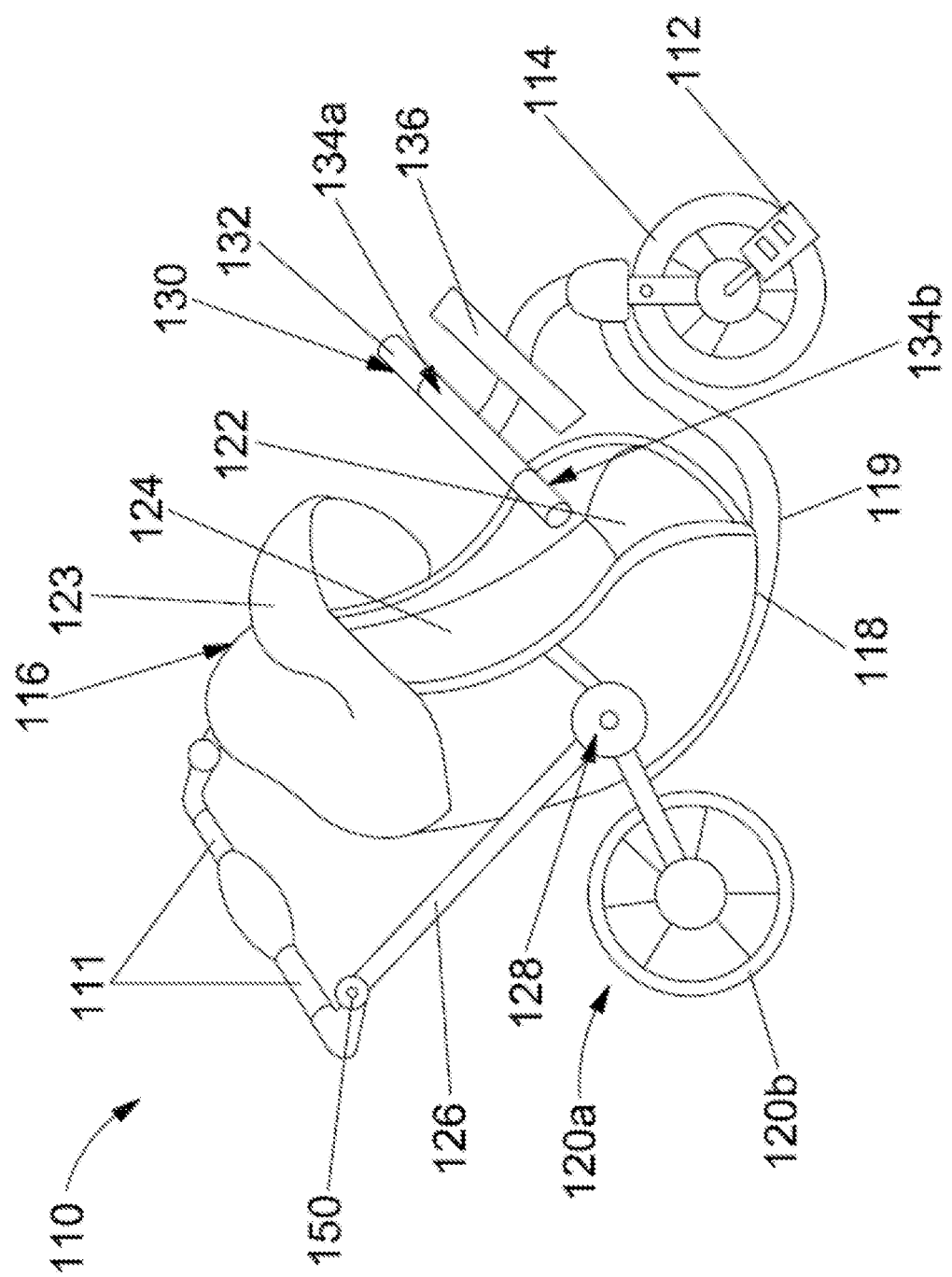
FIG. 5 shows the apparatus of FIG. 3 in a second mode of operation in a first configuration.

Referring now to FIGS. 3 through 5, there is shown a child transportation apparatus 110 according to a second embodiment of the present invention. The apparatus 110 shown in FIGS. 3 to 5 is generally similar to that shown in FIGS. 1 and 2. Accordingly, similar features are denoted by similar reference numerals, incremented by 100. Accordingly, the apparatus 110 of FIGS. 3 to 5 has a seat 116 and a pair of pedals 112.

The apparatus 110 is shown in FIG. 3 in the first mode. Here, the first seating arrangement can comprise a different seat inclination to the second seating arrangement. For example, the first seating arrangement seat position can comprise a rearwardly-inclined seat position and a corresponding second seating arrangement seat position comprises a more upright or more forwardly-inclined seat position. The rearwardly-inclined seat position comprises a seat base 122 tilted backwards relative to a horizontal plane. Accordingly, the seat occupant is facing more upwards in the rearwardly-inclined seat position relative to a non- or less rearwardly-inclined seat position (where, for example, the seat occupant is facing more forwards relative to the rearwardly-inclined seat position). Whereas the apparatus 10 of FIGS. 1 and 2 had a single support arm for the non-occupant handlebars, the apparatus 110 of FIG. 3 has a pair of side arms for supporting the non-occupant handlebars. The adjustability of the inclination of the seat 116 is shown in FIG. 4. Again, here the seat back 124 and seat base 122 are fixed relative to each other. Accordingly, adjustment of the seat back 124 and seat base 122 is linked. In other arrangements (not shown) the seat back and seat base are not connected meaning the seat back can be adjusted without disturbing the positioning of the seat base. To adjust the seat 116 between the positions shown in FIG. 4, a lock 128 is selectively released and activated to allow the seat 116 to pivot about an axis coincident with the lock 128 (second lock provided on other side, but not visible). Similarly, when it is desired to reconfigure the apparatus 10 from the first mode of FIG. 3 to the second mode of FIG. 5, the lock 128 is released and the seat 116 is moved downwards and forwards to the position of FIG. 5.

Here, the seating arrangement positions in the first and second modes are adjustable. For example, the seating arrangement positions in the first and second modes are adjustable to accommodate the occupant as the occupant grows. Each of the seating arrangements comprises adjustability to accommodate children of different age or a child as it grows. The adjustability of each seating arrangement is configured for adjustment between journeys, such as periodically as a single occupant (e.g. a child always or most commonly transported with the apparatus 110) grows. Additionally, here, the seating arrangements are configured for adjustment during a journey. For example, in the first and second modes, the angle of inclination of the seat 116 is adjustable during a single journey, such as increasing the inclination rearwards when the occupant sleeps or wishes to sleep or rest or relax and decreasing the inclination rearwards when the occupant awakes or becomes more alert or active.

During reconfiguration, the occupant handlebars 132 acting as a footrest 130 in FIG. 3, are also moved, upwards and forwards from the position of FIG. 3 to the position of FIG. 5—by pivoting. In the occupant handlebar position of FIG. 5, a cover 136 for the footrest 130 is slid down in a track to reveal the handgrip portions 134a, 134b of the occupant handlebars 132.

FIG. 5 shows the apparatus 110 in a generally similar configuration to the apparatus 10 in FIG. 2.

Although not shown, it will be appreciated that the apparatus 110 in the second mode may be reconfigured to an independent velocipede configuration. Here, in the independent velocipede configuration, the non-occupant user handle/s or handlebar/s 111 is collapsible, such as collapsible to a lowered position (e.g. proximal to or below an upper portion of the seat). Here, the non-occupant user handle/s or handlebar/s 111 is telescopically collapsible; and also hingedly collapsible using hinge locks 150 generally similar to those for the seat 116. In alternative embodiments (not shown), in the independent velocipede configuration, the non-occupant user handle/s or handlebar/s 111 is removable or detachable; such as for storage (e.g. elsewhere in or on the apparatus 110 or at home) or for carrying by the non-occupant user.

In the independent velocipede configuration, all steering and propulsion can be by the occupant, using the occupant handlebars 132 and pedals 112 respectively.

Although not shown, it will be appreciated that a walkalong configuration can also be provided by combining the seating arrangement of FIG. 5 with the pedal configuration of FIG. 3.

Here, the apparatus 110 comprises the same number of wheels in both modes: three wheels in both the first mode of FIG. 3 and the second mode of FIG. 5. In alternative embodiments (not shown), the apparatus comprises a different number of wheels in at least one configuration of one mode. For example in at least an independent bicycle velocipede configuration of the second mode, the apparatus 110 comprises a different number of wheels from the apparatus 110 in at least one configuration of the first mode. For example, the apparatus 110 comprises three wheels in the second mode when functioning as a push-trike, push-bike as shown in FIG. 5; or as an independent tricycle. Additionally the apparatus 110 comprises two wheels in the second mode when functioning as an independent bike (not shown). The apparatus 110 can be converted from a three wheel or trike configuration to a two wheel or bike configuration by removing one of the rear wheels 120a, 120b and moving the other rear wheel 120b, 120a to a rear central position.

In alternative embodiments (not shown), in the walkalong configuration the apparatus 110 comprises two wheels such that the apparatus 110 comprises a balance bike configuration.

The apparatus 110 is collapsible or foldable when not in use, such as for compact storage and/or transportation (e.g. in an automotive vehicle). The apparatus 110 is collapsible or foldable with a single hand by the non-occupant user. The apparatus 110 is collapsible or foldable when not in use, such as for compact storage and/or transportation (e.g. in an automotive vehicle) with a single hand by the non-occupant user. Although not shown, in at least some embodiments, the non-occupant user handle/s or handlebars 111 comprises one or more integrated bag holders to enable for belongings to be hung, such as hooks, clasps, clips or the like. Similarly, in at least some embodiments, the non-occupant user handle/s or handlebars 111 comprises an integrated cup holder, such as to enable the non-occupant user to safely store a drink. The cup holder is usable by the occupant when the apparatus 110 is in an independent velocipede configuration. At least in the first mode and optionally in at least some configurations of the second mode, the apparatus 110 is provided with or at least suitable for receiving a cosy-toes or blanket for covering at least the occupant's feet and/or legs together; and/or a raincover. Similarly, although not shown it will be appreciated that, in at least some embodiments, the seat 116 comprises straps or fasteners. The apparatus 110 is reconfigurable between the modes and/or configurations without unstrapping or unfastening the occupant.

Figure 6:
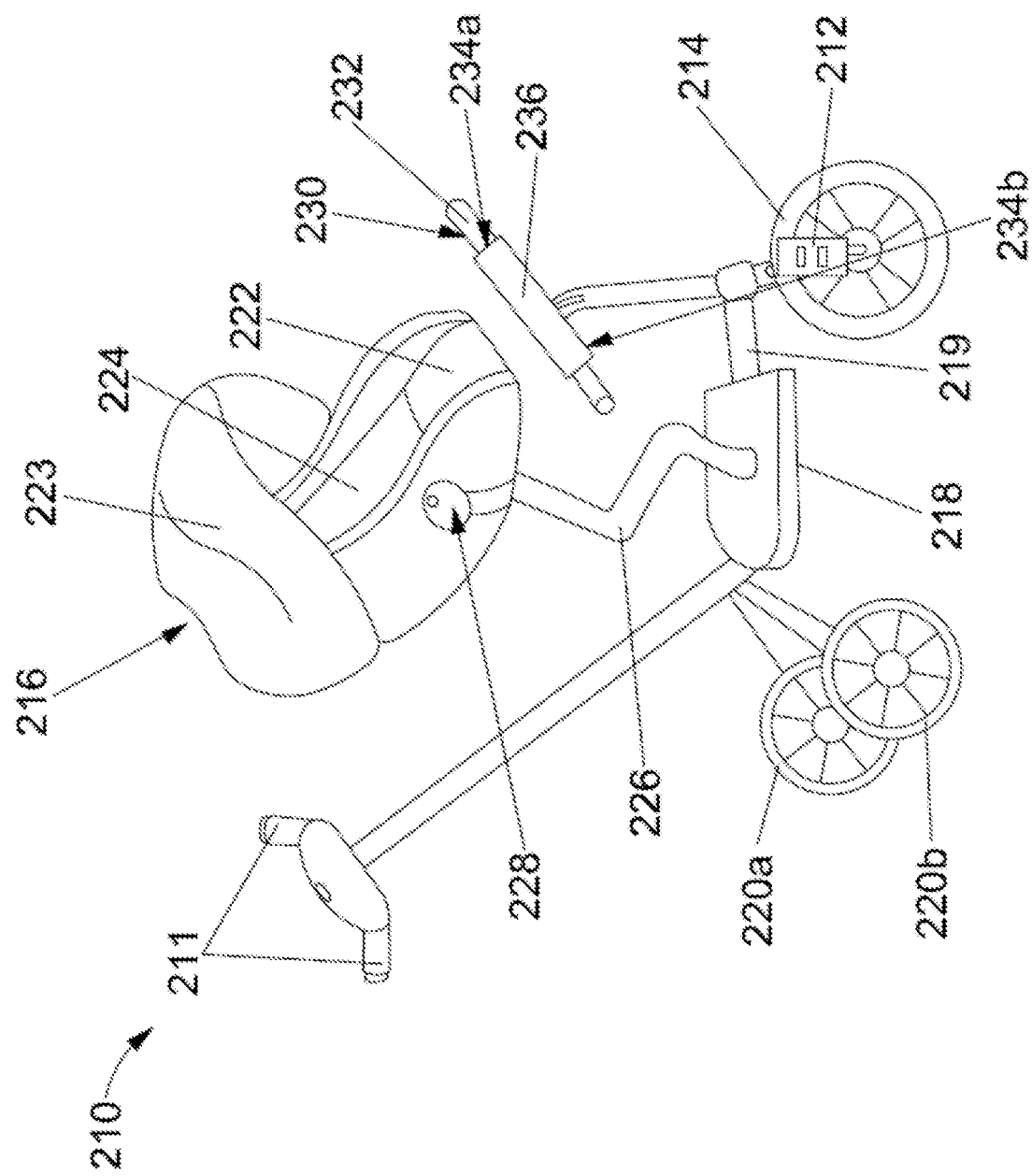
FIG. 6 shows a schematic representation of another transportation apparatus in a first mode of operation.
Figure 7:
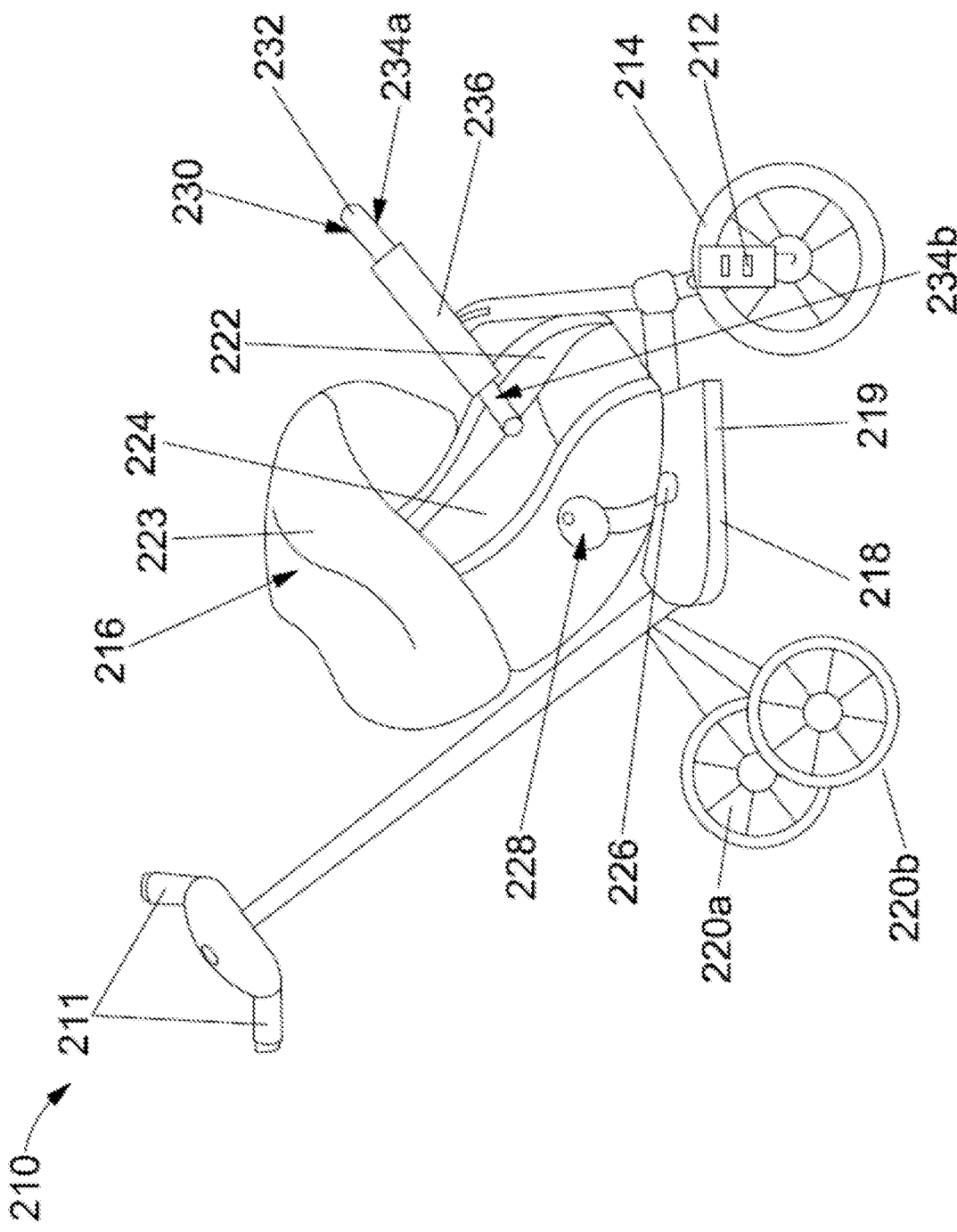
FIG. 7 shows the apparatus of FIG. 6 in a second mode of operation in a first configuration.

Referring now to FIGS. 6 and 7, there is shown a child transportation apparatus 210 according to a third embodiment of the present invention. The apparatus 210 shown in FIGS. 6 and 7 is generally similar to that shown in FIGS. 3 to 5. Accordingly, similar features are denoted by similar reference numerals, incremented by 100. Accordingly, the apparatus 210 of FIGS. 6 and 7 has a seat 216 and a pair of pedals 212.

Here, the first and second seating arrangements comprise a similar longitudinal position of the seat 216.

The reconfigurability and/or adjustability is guided. Again, here, the reconfigurability and/or adjustability is manual and assisted. The apparatus 210 is reconfigurable between the first and second modes and/or adjustable within the/each mode/s using an adjustable support arm 226. It will be appreciated that in at least some embodiments, the reconfigurability between the first and second modes and/or adjustability within the/each mode/s is automatic. At least a portion of the weight of the seat 216 and/or the occupant is borne or compensated by a compensation system, such as here with the arm 226. The arm is locked in the position of FIG. 6 for the first mode. When it is desired to reconfigure to the second mode, the joints of the arm 226 are unlocked by releasing a lock 228 and the seat 216 is gradually lowered into position, controlled by the resistance of the spring forces in the arm 226 and the arm 226 is optionally locked in the position of the second mode. When it is desired to reconfigure from the second mode to the first mode of FIG. 1, the joints of the arm 226 are unlocked if necessary and the seat 216 is gradually raised into position, assisted by the spring forces in the arm 226. It will be appreciated that in at least some embodiments, the resistance or spring force in the arm 226 may be provided by hydraulics, such as a hydraulic linear and/or rotary piston/s. Providing assistance when adjusting the seating arrangement may help in reconfiguring the apparatus 210 between modes without requiring the removal of the occupant. It will also be appreciated that in at least some embodiments, the arm 226 is not sprung or spring-loaded and is freely-movable without providing resistance or assistance.

Although not shown, it will be appreciated that in at least some embodiments, the seat 216 is removable. The apparatus 210 can be configured to receive a plurality of seats, such as selected from an array of seats (e.g. of different sizes and/or types and/or styles). The seat 216 can removable for replacement, repair, cleaning. The seat 216 can be removable for use in other applications. For example, the apparatus 210 can be configured to receive a system seat or seats, such as an interchangeable car seat and/or interchangeable carrycot and/or interchangeable stroller or pram seat or the like.

Although not shown, in at least some embodiments, the non-occupant user handle/s or handlebars 211 comprises one or more integrated bag holders to enable for belongings to be hung, such as hooks, clasps, clips or the like. Similarly, in at least some embodiments, the non-occupant user handle/s or handlebars 211 comprises an integrated cup holder, such as to enable the non-occupant user to safely store a drink. The cup holder is usable by the occupant when the apparatus 210 is in an independent velocipede configuration.

At least in the first mode and optionally in at least some configurations of the second mode, the apparatus 210 is provided with or at least suitable for receiving a cosy-toes or blanket for covering at least the occupant's feet and/or legs together; and/or a raincover.

Similarly, although not shown it will be appreciated that, in at least some embodiments, the seat 216 comprises straps or fasteners. The apparatus 210 is reconfigurable between the modes and/or configurations without unstrapping or unfastening the occupant.

The apparatus 210 comprises one or more brakes. The one or more brakes is occupant activated and/or non-occupant user activated. The one or more brakes is selectively deactivated so as to prevent braking ability. The one or more brakes is selectively deactivated so as to prevent braking ability in one or more of the modes or configurations. For example, an occupant brake is deactivated in all configurations other than independent velocipede configurations. The apparatus 210 is collapsible or foldable when not in use, such as for compact storage and/or transportation (e.g. in an automotive vehicle) with a single hand by the non-occupant user.

If the child gets tired in the second mode, the apparatus 210 can be transferred back to the first mode at any point without removing or unfastening the child. Alternatively if the child becomes active in the first mode, the apparatus 210 can be transformed to the second mode without removing or unfastening the child. This is achieved with no additional parts being added or removed.

Figure 8:
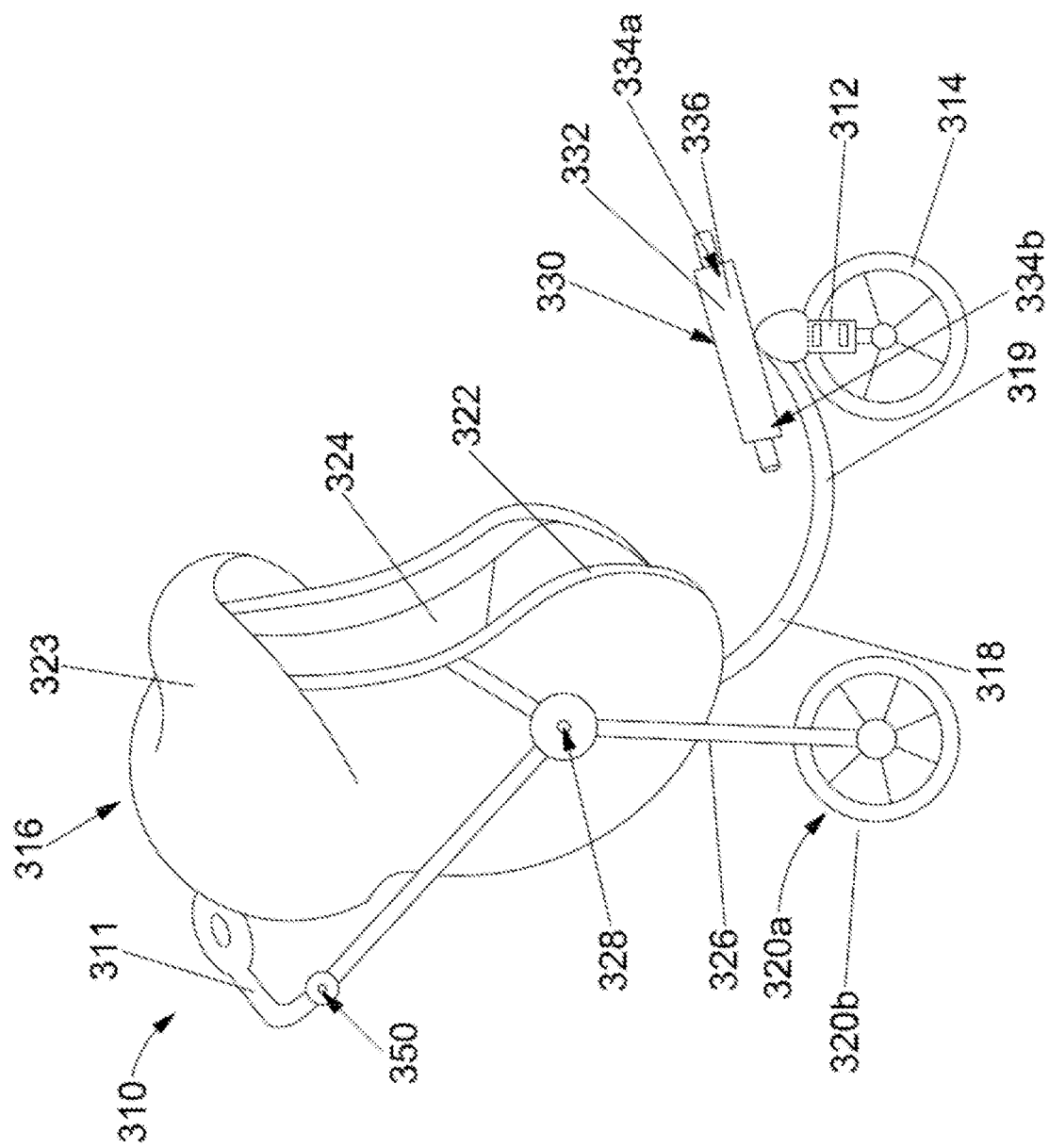
FIG. 8 shows a schematic representation of another transportation apparatus in a first mode of operation.
Figure 9:
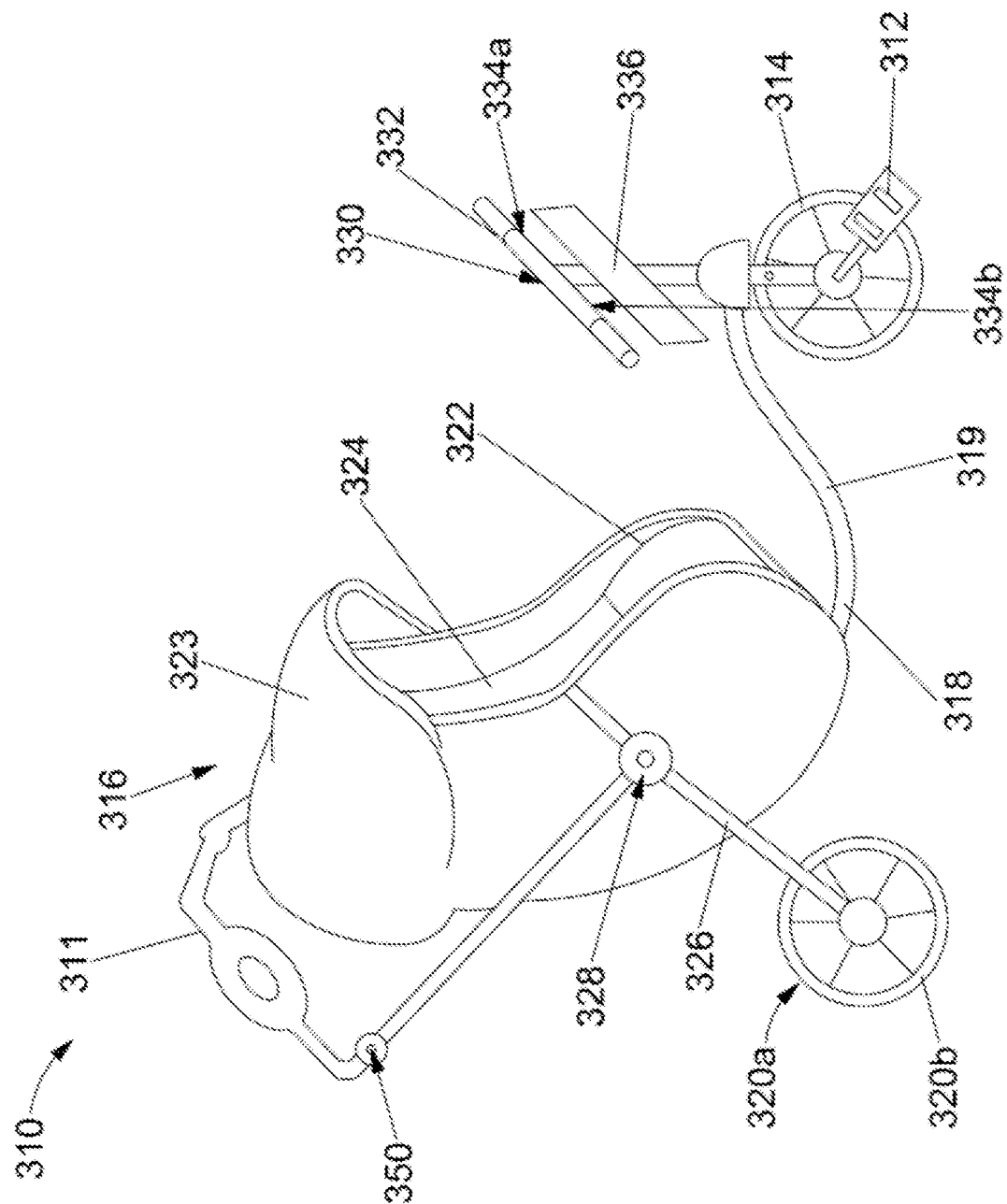
FIG. 9 shows the apparatus of FIG. 8 in a second mode of operation in a first configuration.

Referring now to FIGS. 8 and 9, there is shown a child transportation apparatus 310 according to a fourth embodiment of the present invention. The apparatus 310 shown in FIGS. 8 and 9 is generally similar to that shown in FIGS. 6 and 7. Accordingly, similar features are denoted by similar reference numerals, incremented by 100. Accordingly, the apparatus 310 of FIGS. 8 and 9 has a seat 316 and a pair of pedals 312.

Here, the apparatus is reconfigurable between the first mode of FIG. 8 and the second mode of FIG. 9 by rotating the supporting arm 326 in a downwards forward position relative to the chassis 318, upon release of the lock 328. Accordingly the seat 316 is positioned downwards and forwards towards the front wheel 314. At the same time, the pedals 312 are folded down, released or flipped, down and the occupant footrest 330 is telescopically pulled up to become the handlebars 332 in the second mode of FIG. 9. The cover 336 is slid down to expose the grips 334a, 334b. Accordingly the occupant child may pedal the pedals 312 and/or walkalong, push and/or steer by contacting the ground with their feet, at least when the child is of sufficient size.

If the child gets tired in the second mode, the apparatus 310 can be transferred back to the first mode at any point without removing or unfastening the child. Alternatively if the child becomes active in the first mode, the apparatus 310 can be transformed to the second mode without removing or unfastening the child. This is achieved with no additional parts being added or removed.

Referring now to FIGS. 10 and 11, there is shown a child transportation apparatus 410 according to a fifth embodiment of the present invention. The apparatus 410 shown in FIGS. 10 and 11 is generally similar to that shown in FIGS. 8 and 9. Accordingly, similar features are denoted by similar reference numerals, incremented by 100. Accordingly, the apparatus 410 of FIGS. 10 and 11 has a seat 416 and a pair of pedals 412.

However, here rather than a seating arrangement that is adjustable between the first mode of FIG. 10 and the second mode of FIG. 11, the seat 416 remains substantially in the same position. The apparatus 410 is reconfigured between the first and second modes merely by adjusting the handlebars 432 of FIG. 10 to become the footrest 430 of FIG. 11; and vice versa. In the embodiment shown here, the handlebars 432 are adjusted by sliding the handlebars 432 along a portion of the chassis 418, as indicated by an arrow 433 in FIG. 11 from provision as the footrest 430 in FIG. 10 to provision as the handlebars 432 in FIG. 11. It will be appreciated that the handlebars 432 shown in FIG. 11 may be returned to become the footrest 430 in FIG. 10 by reverse movement against the arrow 433.

Reference is now made to FIGS. 12 and 13 which show a portion of a child transportation apparatus 510 according to a sixth embodiment of the present invention, with similar features denoted by similar reference numerals, incremented by 100. Accordingly, the portion of the child transportation apparatus 510 of FIGS. 12 and 13 has a non-occupant handlebars 511.

As shown in FIGS. 12 and 13, the integrated accessory holder 560 here is a non-occupant cup holder permanently attached to the handlebars 511, which is reconfigurable between a storage position of FIG. 12 and an active use configuration of FIG. 13. Here, a push button 570 is depressed to release a sprung-loaded cup-holder in the form a tray with an aperture sized and shaped to receive a plurality of cups, such as an array cups of different frusto-conical cross-sections or diameters. The cup-holder is returned to the storage position of FIG. 12 by pushing against the spring, and latching in place for future subsequent release by depression of the button 570. Whenever the occupant wishes to support a drink in the integrated accessory holder 560, the push-button 570 is pressed to open the integrated accessory holder 560. Whenever the occupant wishes to store the integrated accessory holder 560, the integrated accessory holder 560 is simply pushed back into the handlebars 511.

Reference is now made to FIGS. 14 and 15 which show a portion of a child transportation apparatus 610 according to a seventh embodiment of the present invention. The portion of the apparatus 610 shown in FIGS. 14 and 15 is generally similar to that shown in FIGS. 12 and 13. Accordingly, similar features are denoted by similar reference numerals, incremented by 100. Accordingly, the portion of the child transportation apparatus 610 of FIGS. 14 and 15 has a non-occupant handlebars 611 and an integrated accessory holder 660.

Here, the integrated accessory holder 660 is a collapsible, foldable drinks holder, which can be manually extended between the storage position of FIG. 14 and the use position of FIG. 15.

Reference is now made to FIG. 16 which shows a portion of a child transportation apparatus 710 according to an eighth embodiment of the present invention. The portion of the apparatus 710 shown in FIG. 16 is generally similar to that shown in FIGS. 14 and 15. Accordingly, similar features are denoted by similar reference numerals, incremented by 100. Accordingly, the portion of the child transportation apparatus 710 of FIG. 16 has a non-occupant handlebars 711 and an integrated accessory holder 760.

Here, the integrated accessory holder 760 is a reconfigurable drinks holder, which can be manually reconfigured between a storage position and a use position by simply pulling out relative the handlebars 711, the use position being a substantially horizontal orientation of the accessory holder 760.

Reference is now made to FIGS. 17 and 18 which show a portion of a child transportation apparatus 810 according to a ninth embodiment of the present invention. The portion of the apparatus 810 shown in FIGS. 17 and 18 is generally similar to that shown in FIG. 16. Accordingly, similar features are denoted by similar reference numerals, incremented by 100. Accordingly, the portion of the child transportation apparatus 810 of FIGS. 17 and 18 has a non-occupant handlebars 811 and an integrated accessory holder 860.

Here, there are a plurality of integrated accessory holders 860 in the form of bag-holding hooks, which are arranged along side-portions of the handlebars 811. The accessory holders 860 are reconfigurable from a storage position of FIG. 17 to a bag-carrying use position of FIG. 18 by pivoting to flip down relative to the side portion of the handlebars 811 (and vice versa).

Reference is now made to FIGS. 19 and 20 which show a portion of a child transportation apparatus 910 according to a tenth embodiment of the present invention. The portion of the apparatus 910 shown in FIGS. 19 and 20 is generally similar to that shown in FIGS. 17 and 18. Accordingly, similar features are denoted by similar reference numerals, incremented by 100. Accordingly, the portion of the child transportation apparatus 910 of FIGS. 19 and 20 has a non-occupant handlebars 911 and a plurality of integrated accessory holders 960.

Here again, the plurality of integrated accessory holders 960 are in the form of bag-holding hooks, which are arranged along side-portions of the handlebars 911. The accessory holders 960 are extendable from storage positions of FIG. 19 to bag-carrying use positions of FIG. 20 by sprung latching mechanisms to alternate between pushed-in non-use storage positions and extended. The reconfiguration is achieved by alternate pushing-in of the holders 960: push-in once is extended, push-in twice is retracted, push-in a third time is extended again, etc.

As can be seen in FIG. 19, a plurality of accessory holders 960 is provided on each side of the apparatus 910, such as to allow an even distribution of load on the apparatus (e.g. when bags are carried on either side of the handlebars 911).

It will be appreciated that the accessory holder/s 560, 660, 760, 860, 960 of any of FIGS. 12 to 20 may be integrated in any of the apparatus 10, 110, 210, 310, 410 of FIGS. 1 to 11; and/or in other child transportation, such as child transportation apparatus with a single mode of operation (e.g. a stroller, push-chair, pram, trike, or the like). Similarly, it will be appreciated that a child transportation apparatus may incorporate one or more of the different types of integrated accessory holders 560, 660, 760, 860, 960 shown in any of FIGS. 12 to 20.

The apparatus in any mode can accommodate an array of different apparatus to be attachable/detachable such as a carrycot, car seat forward/rear facing infant seat, additional seats for multiple children of the same or different ages, a boogie board attached to the back wheels.

Referring now to FIGS. 21 and 22, there is shown a child transportation apparatus 1010 according to an eleventh embodiment of the present invention. The apparatus 1010 shown in FIGS. 21 and 22 is generally similar to that shown in FIGS. 1 and 2. Accordingly, similar features are denoted by similar reference numerals, incremented by 1000. Accordingly, the apparatus 1010 of FIGS. 21 and 22 has a seat 1016 and a pair of pedals 1012.

The apparatus 1010 is shown in FIG. 21 in the first mode; and in a first configuration of the second mode in FIG. 22—which is a push-trike configuration as shown here in FIG. 22.

Here, the occupant handlebars 1032 are removable and replaceable to reconfigure the apparatus 1010 between the first and second modes. For example, to reconfigure the apparatus 1010 from the second mode of FIG. 22 to the first mode of FIG. 21, the handlebars 1032 may be removed by sliding telescopically entirely out of a shaft supporting the front wheel 1014. To reconfigure the apparatus 1010 from the first mode of FIG. 21 to the second mode of FIG. 22, the handlebars 1032 may be reinserted. It will be appreciated that in the first mode of FIG. 21, the handlebars 1032 may be stored remotely, such as in a home or garage or the like or on or with the apparatus 1010, such as in a storage basket, tray or compartment under the seat 1016.

As shown in FIG. 22, the pair of pedals 1012 is directly connected to a front wheel 1014 of the apparatus 1010, the front wheel 1014 contacting and supporting the apparatus 1010 on the ground and providing a rolling contact. Accordingly, when engagedly connected, torque is transferred between the pair of pedals 1012 and the front wheel 1014 so as to propel the apparatus 1010. The pair of pedals 1012 is disengaged or deactivated by entirely detaching the pedals 1012 from the wheel 1014, such as for remote storage of the pedals 1012 (e.g. elsewhere in or on the apparatus 1010, and/or at home). For example, although not shown in FIG. 21, it will be appreciated that the apparatus 1010 may be reconfigured from the second mode of FIG. 22 to the first mode of FIG. 21 by removing the pair of pedals 1012 and optionally storing the pair of pedals 1012 in a storage basket, tray or compartment under the seat 1016.

Here, the apparatus 1010 comprises a footrest 1030; which may be particularly useful for supporting a child's feet when not engaging the pair of pedals 1012, such as in the first mode of FIG. 21. As can clearly be seen in FIG. 21, the apparatus 1010 provides entirely the appearance of a stroller, push-chair or perambulator (pram) when in the first mode, the pedals 1012 and handlebars 1032 having been discretely stored.

Referring now to FIG. 23, there is shown a child transportation apparatus 1110 according to a twelfth embodiment of the present invention. The apparatus 1110 shown in FIG. 23 is generally similar to that shown in FIGS. 21 and 22. Accordingly, similar features are denoted by similar reference numerals, incremented by 100. Accordingly, the apparatus 1110 of FIG. 23 has a seat 1116 and a front wheel 1114.

The apparatus 1110 is shown in FIG. 23 in a first configuration of the second mode—which is an independent walkalong or balance bike/trike configuration as shown here. A non-occupant handlebar (not shown) has been removed from the first mode (not shown, but similar to FIG. 21) to allow the apparatus 1110 to be entirely independently driven and steered by a child occupant. The occupant handlebars 1132 allow for steering entirely by the occupant in this configuration of the second mode. Here, the pedals have been removed, or at least not attached in the second mode. Accordingly, the apparatus 1110 is independently driven by the occupant pushing the apparatus 1110 along with their feet pushing against the ground underneath. It will be appreciated, that a footrest similar to that shown in FIGS. 21 and 22 may have been removed, or at least not attached, such that the occupant may walk the apparatus 1110 along unimpeded. It will also be appreciated, that the apparatus 1110 may be reconfigured to a further configuration/s of the second mode by attaching the non-occupant handlebars and/or the pedals.

Figure 24:
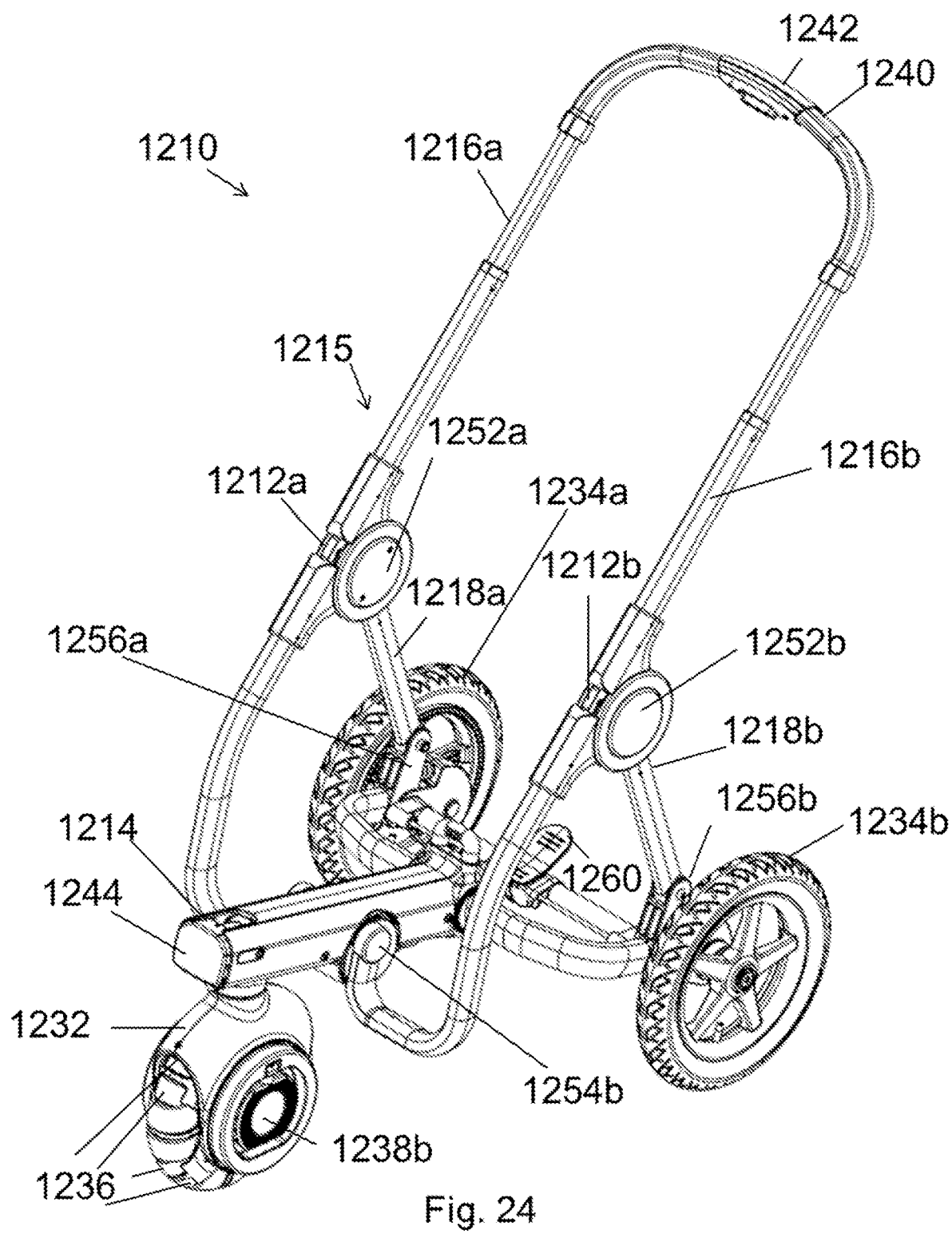
FIG. 24 shows a perspective view of the frame of another transportation apparatus.

Referring now to FIG. 24, there is shown a frame 1210 for a transportation apparatus, the frame having a base portion 1214, and a top portion 1215. The top portion 1215 comprises two front arms 1216a,b and two rear arms 1218a,b. The frame has, at each front arm 1216a,b, an engagement portion 1212a,b adapted to receive one or more occupant support devices (with reference to FIGS. 29 to 32). Wth reference to FIGS. 33 to 36, the engagement portion is defined by a region of the front arms 1216a,b.

The front arms 1216,a,b are attached to two opposite sides of the base portion 1214 by means of rotating barrels 1254a (not shown) and 1254b. The barrels 1254a,b rotate to allow the engagement portions 1212a,b of the front arms 1216a,b to be lowered and brought closer to the front end of base portion 1214 when passing from the first configuration to the second configuration. The rear arms 1218a,b are attached to the base portion 1214 by means of hinges 1256a,b, said hinges allowing the rear arms 1218a,b to pivot forward when the frame passes from the first configuration to the second configuration. Each rear arm 1218a,b is attached to the corresponding front arm 1216a,b by means of a hinge 1252a,b, which is configured to rotate when the frame passes from the first configuration to the second configuration. This rotation allows the engagement portion 1212a,b to be located forwards and lower in the second configuration compared to the location in the first configuration, such that the seat engagement portion 1212a,b is nearer the front end of the base portion 1214 of frame 1210.

Frame 1210 comprises a telescopic non-occupant handlebar 1240 connecting the two front arms 1216a,b at the rear end of the frame 1210. The handlebar 1240 may be used by a non-occupant to hold and/or steer the frame when in use. The arms 1216a,b are telescopic, allowing the length of the front arms 1216a,b to be modified, for example to adjust to different heights of non-occupant users. The non-occupant handle 1240 comprises an actuator 1242 to enable the length of the front arms 1216a, b to be modified and/or to enable the frame 1210 to pass from a deployed and/or non-folded state (shown in FIG. 24) to a folded state (not shown).

Frame 1210 comprises one front wheel 1232 attached to the front end of base portion 1214 and two rear wheels 1234a,b attached to the rear end of base portion 1214. Front wheel 1232 is an omni wheel comprising rolling elements 1236. Beneficially, a front omni wheel 1232 enables a non-occupant user of the transportation apparatus to steer or change the direction of travel of the apparatus independently from the orientation of the wheel, in order to provide manoeuverability of the frame 1210 with reduced effort. Front wheel 1232 comprises pedals 1238, which are folded or stored in a stowed configuration on the sides of the front wheel 1232 in FIG. 24. Beneficially, providing foldable pedals avoids or reduces the risk of damaging the pedals and/or injuring passers-by and/or the occupant when the pedals are not in use, thus improving safety. In this embodiment, rear wheels 1234a,b are air-filled tyres. Beneficially, air filled tires may provide greater suspension on uneven terrains, facilitating the manoeuverabiliy of the apparatus.

Frame 1210 also comprises a steering member 1244, which is integrated and stored within the front end of the base portion 1214 in the first configuration shown in FIG. 24. Beneficially, the steering member 1244 is not accessible by an occupant when the apparatus is in the first configuration and it is not in the way of the occupant and/or non-occupant user, facilitating the loading and unloading operations of the apparatus.

Frame 1210 comprises a brake 1260 at the rear end of the base portion 1214. The brake 1260 may be actuated to restrict or prevent movement of at least one of the front and/or rear wheels, for example to ensure that the apparatus does not move and/or roll away from the non-occupant unintentionally.

Figure 26:
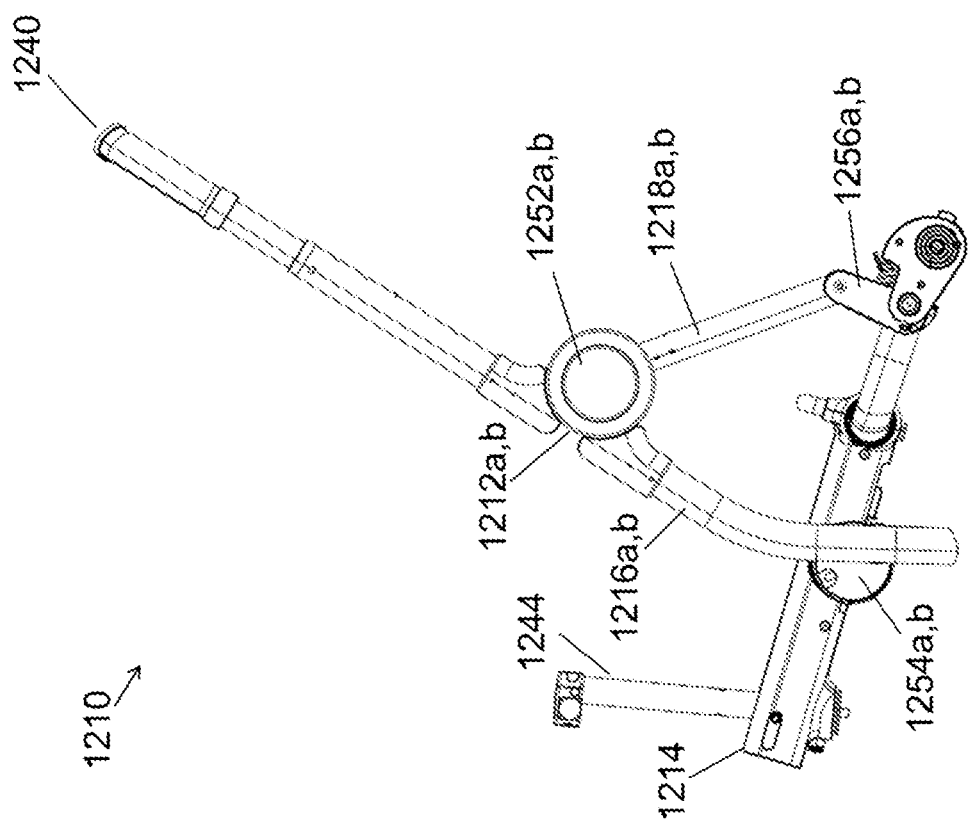
FIG. 26 shows s schematic representation of the frame of FIG. 24 in the second configuration.
Figure 25:
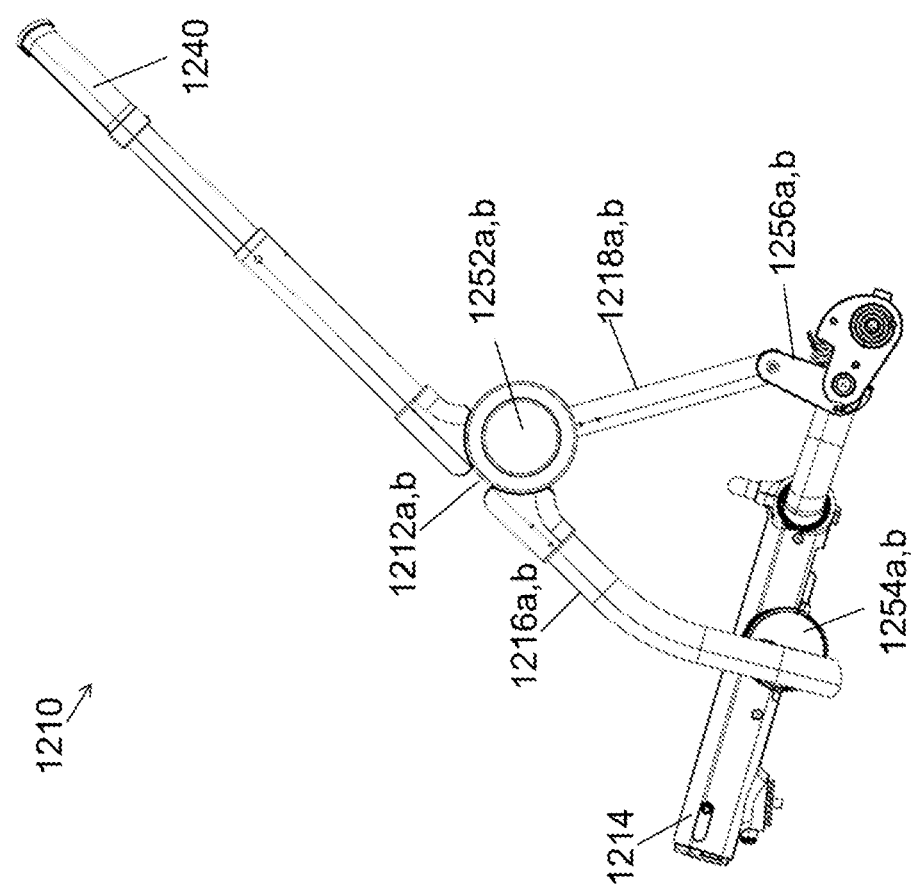
FIG. 25 shows a side view of the frame of FIG. 24 without wheels in the first configuration.

FIGS. 25 and 26 show side views of the frame 1210 shown in FIG. 24 in the first configuration and the second configuration, respectively. Going from FIG. 25 to FIG. 26, the front arms rotate about barrels 1254a,b and pivot about hinges 1252a,b such that the engagement portions 1212a,b of the front arms 1216a,b are lowered and brought closer to the front end of base portion 1214 when passing from the first configuration (FIG. 25) to the second configuration (FIG. 26). The rear arms 1218a,b also move forward relative to the base portion 1214, by pivoting about the hinges 1256a,b and 1252a,b. Thus, moving from the first configuration to the second configuration both the front arms 1214a,b and the rear arms 1218a,b move forward and downwards relative to the base portion 1214 and the occupant support engagement portions 1212a,b move to a location nearer the front end of the base portion 1214 of frame 1210 in the second configuration (FIG. 26) compared to the first configuration (FIG. 25). In the second configuration shown in FIG. 26 the frame 1210 also comprises an extended steering member 1244 to enable an occupant to steer the apparatus in the second configuration. The steering member 1244 folded and stored within the frame 1210 in the first configuration shown in FIG. 25.

Figure 27:
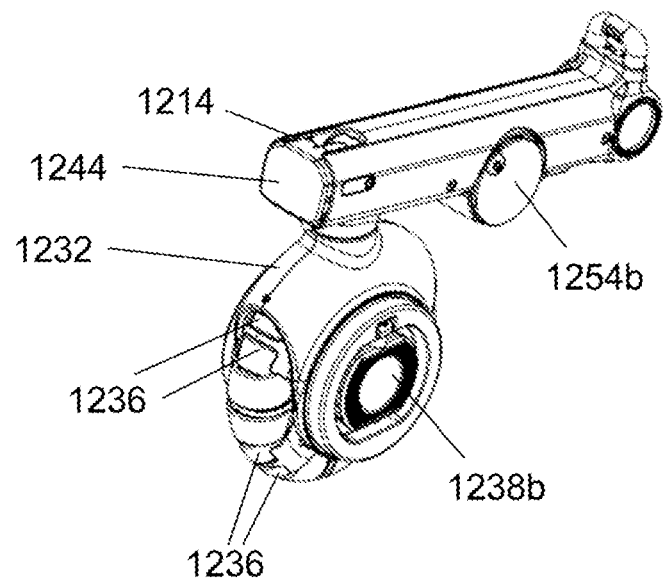
FIG. 27 shows a detail of the front portion of the frame of FIG. 24 with the front wheel in the first configuration.
Figure 28:
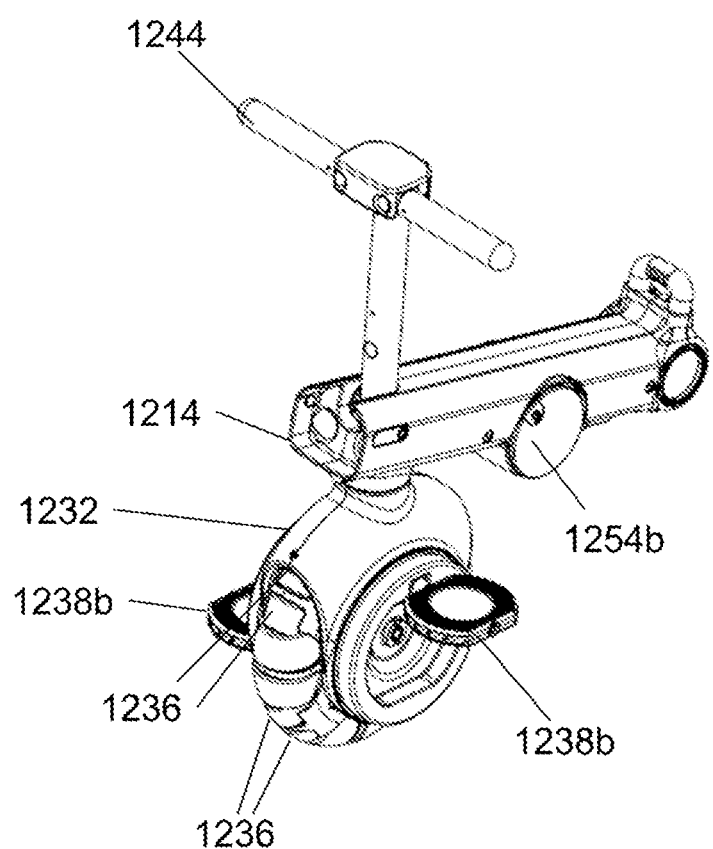
FIG. 28 shows a detail of the front portion of the frame of FIG. 24 with the front wheel in the second configuration.

Enlarged details of the front end of the base portion 1214 with the front wheel 1232 attached are shown on FIG. 27 in the first configuration and on FIG. 28 in the second configuration. In these Figures the rollers 1236 of the omni wheel 1232 are best appreciated. Pedals 1238a (not shown) and 1238b are folded onto the sides of the wheel 1232 in the first configuration shown in FIG. 27 and they are deployed outwards and parallel to the ground in the second configuration shown on FIG. 28, in order to enable an occupant to pedal and propel the apparatus when in use. Steering member 1244 is integrated within the front end of the base portion 1214 in the first configuration shown in FIG. 27 and it is deployed in the second configuration shown on FIG. 28. The steering member 1244 enables steering of the transportation apparatus when the steering member is engaged with and/or locked relative to the front wheel 1232. Steering member 1244 does not enable steering of the transportation apparatus when the steering member 1244 is not engaged with and/or locked relative to the front wheel 1232. Advantageously, disabling engagement and/or a lock of the steering member relative to the front wheel 1232 can increase the safety of the transportation apparatus and facilitate the manoeuvrability of the transportation apparatus by a non-occupant user. For example, when the non-occupant user is trying to steer the apparatus, the steering motion is not affected by movement of the steering member 1244 by an occupant (e.g. a child), when the steering member 1244 is not engaged with and/or locked relative to the front wheel 1232. The steering member 1244 is releasably engageable with the at least one front wheel to enable steering of the transportation apparatus.

Advantageously, having a steering member integrated within the frame 1210 minimises the number of loose parts that have to be carried around with the apparatus, thus reducing bulk and the risk of losing said parts. When the apparatus is moved from the first configuration to the second configuration the steering member 1244 is slid out of the base portion 1214, bent such that the steering member 1244 is located at a right angle from the base member 1214 and the portions of the steering member to which an occupant would hold on to are also unfolded or extended outwards, to the position shown on FIG. 28.

Figure 29:
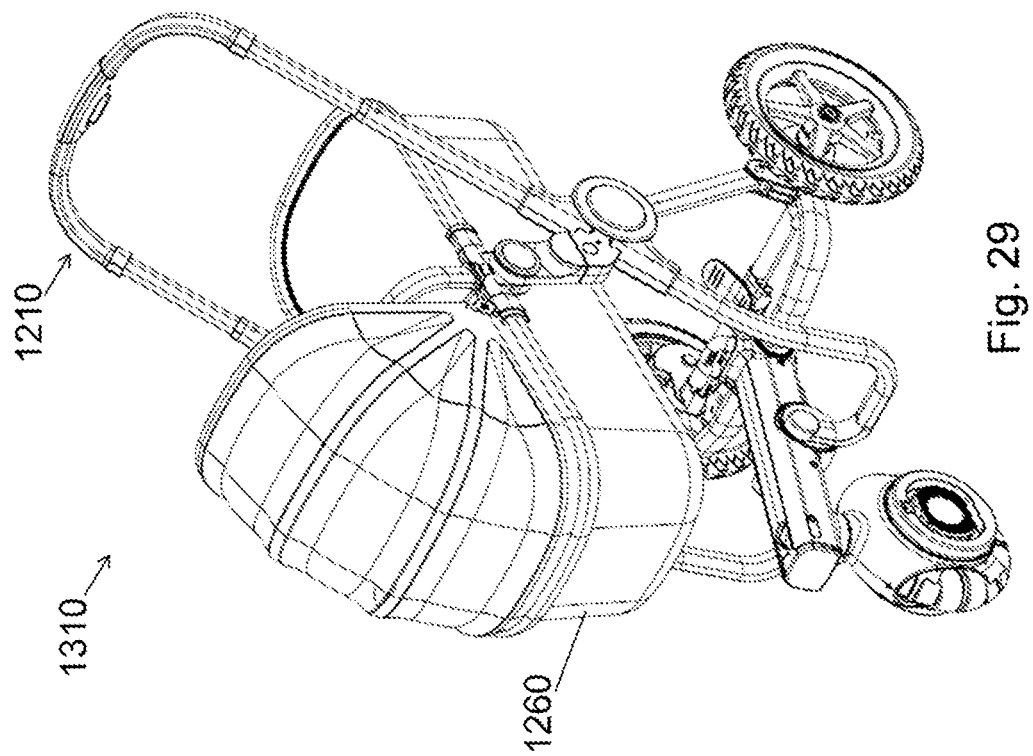
FIG. 29 shows a perspective view of the transportation apparatus of FIGS. 24-28 in the first configuration with a carrycot occupant support device.

FIG. 29 shows the apparatus 1310 comprising the frame 1210 as described above with an occupant support device attached to it, which in this case is a carrycot 1260.

Figure 30:
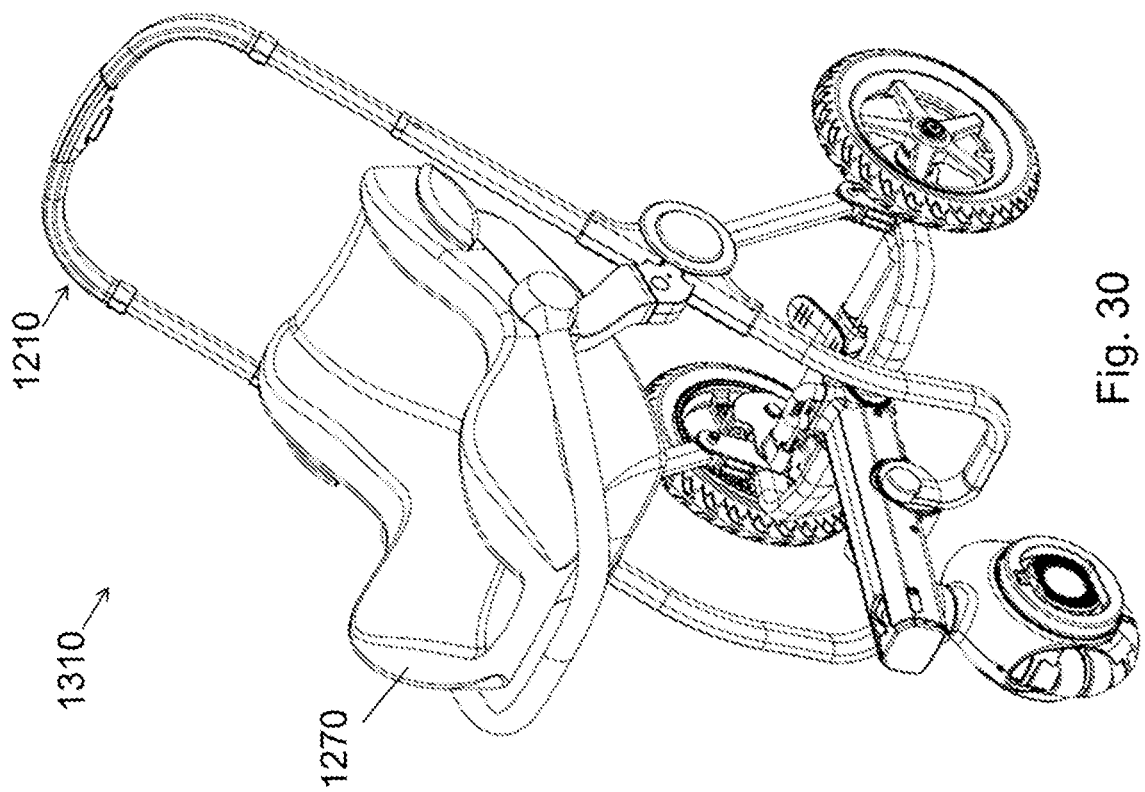
FIG. 30 shows a perspective view of the transportation apparatus of FIGS. 24-28 in the first configuration with a car seat occupant support device.
Figure 32:
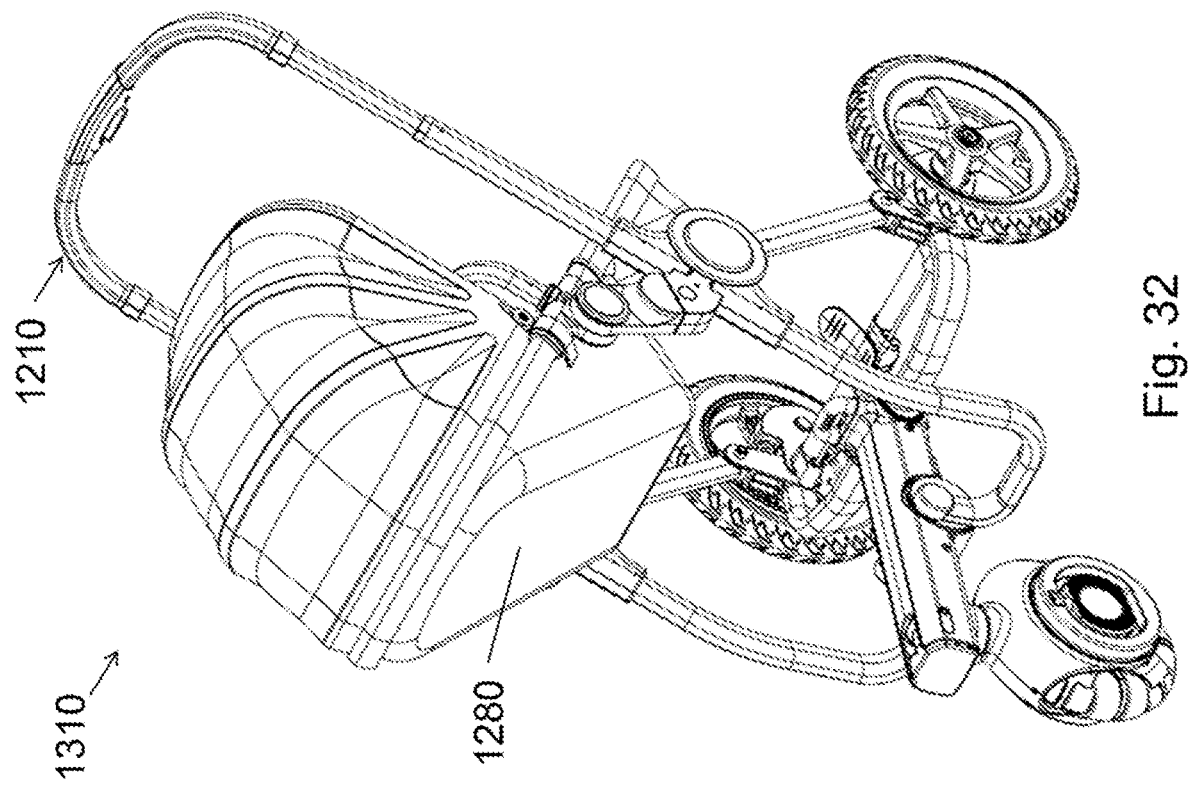
FIG. 32 shows a perspective view of the transportation apparatus of FIGS. 24-28 in the first configuration with a midi seat occupant support device facing backwards.
Figure 31:
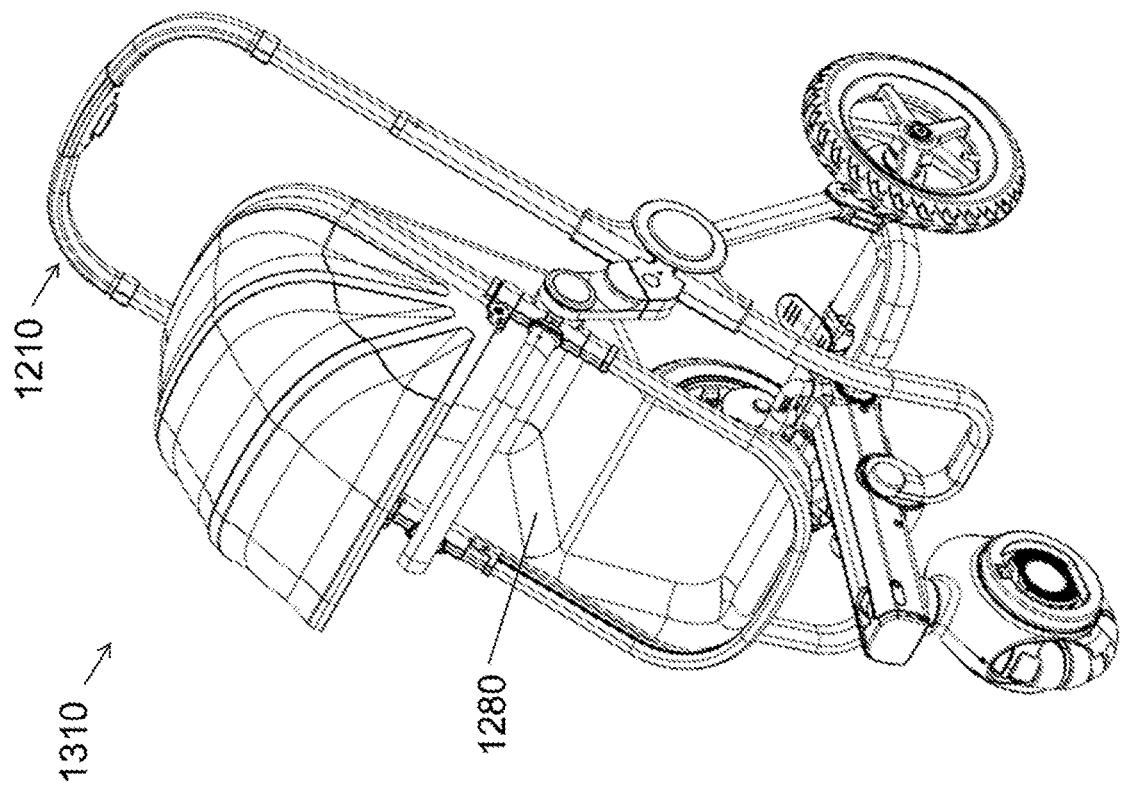
FIG. 31 shows a perspective view of the transportation apparatus of FIGS. 24-28 in the first configuration with a midi seat occupant support device facing forwards.

In FIG. 30 the apparatus 1310 has a car seat 1270 as the occupant support device attached to the frame 1210 and FIGS. 31 and 32 have a midi seat 1280 (facing forwards and backwards respectively) attached to the frame 1210.

Figure 34:
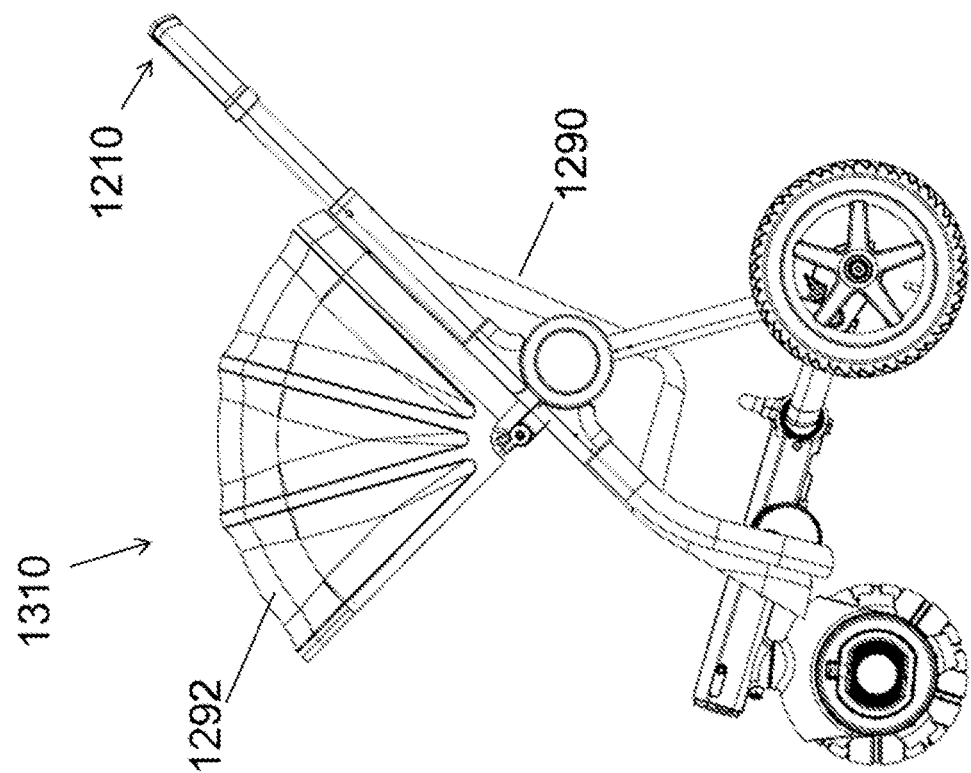
FIG. 34 shows a side view of the transportation apparatus of FIG. 33.
Figure 33:
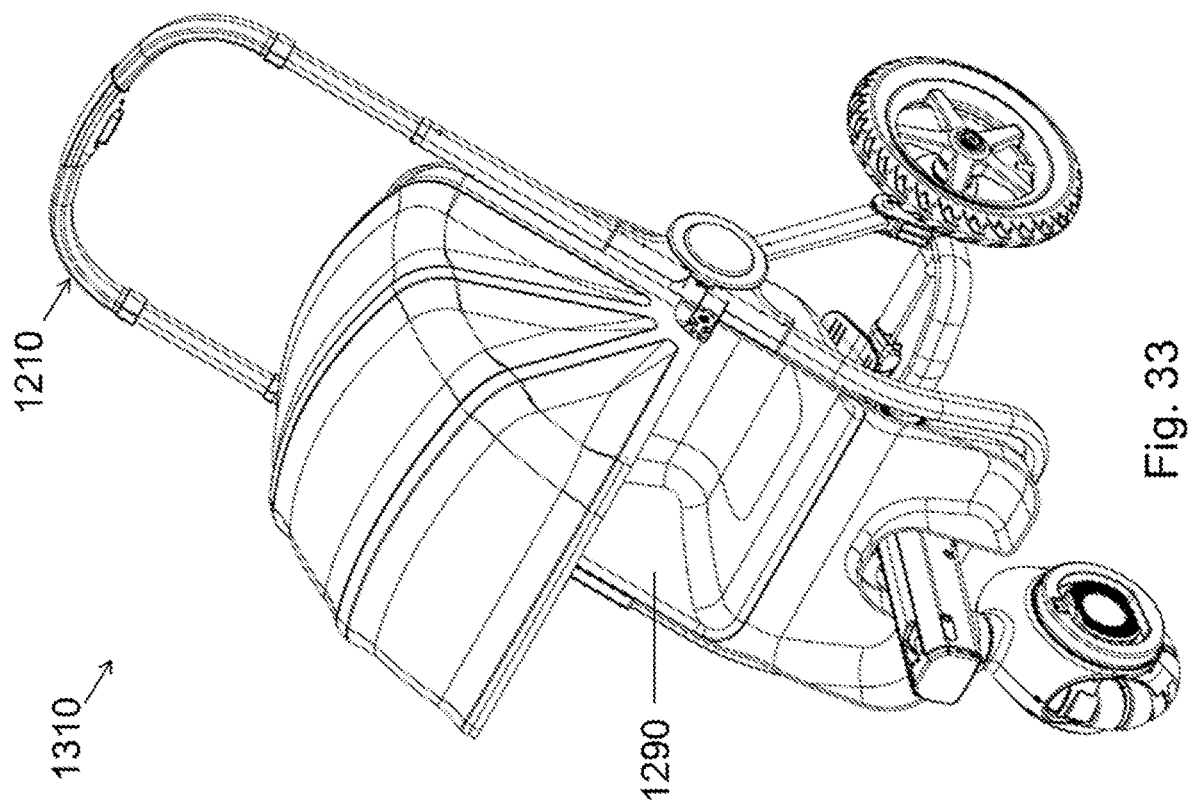
FIG. 33 shows a perspective view of the transportation apparatus of FIGS. 24-28 in the first configuration with a stroller seat occupant support device facing forwards.

FIGS. 33 and 34 show the apparatus 1310 with a stroller seat 1290 as the occupant support device attached to frame 1210. In the embodiments of FIGS. 33 to 36, the engagement portion is defined by a portion of the front arms 1216a,b of the frame 1210 to which the seat 1290 attaches (in this embodiment by clipping the seat 1290 onto the frame 1210).

The frame 1210 is in the first configuration in all of FIGS. 29-34. In this configuration the occupant sits or lies in a relaxed position on the occupant support device, not being able to engage with the frame 1210, for example to propel the apparatus 1310. In the first configuration, the feet of the occupant are elevated from the floor such that the occupant may not touch the ground, the steering member 1244 and/or the pedals 1238. Beneficially, a single frame 1210 can receive multiple occupant support devices providing multiple products within a single apparatus. For example, the apparatus can be adapted to accommodate a growing child, from birth (with a carrycot 1260 or car seat 1270 as the occupant support devices attached to the frame 1210), it can support a young baby from about 4 months to about 4 years with a midi seat 1280 as the occupant support device and it can be used to support a child from about 10 months to about 4 years with a push chair seat 1290 as the occupant support device. When an occupant is seated on the stroller seat 1290, said occupant is located on a position closer to the base portion 1214 of the frame 1210 when compared to the position of the occupant when the midi seat 1280 is attached to the frame 1210. Beneficially, the stroller seat 1290 occupant support device can be used in the first and second configurations of the apparatus 1310, such that the apparatus 1310 can be converted from a stroller (see FIGS. 33 and 34) in the first configuration to a trike (see FIGS. 35 and 36) in the second configuration. The conversion from stroller mode to trike mode can be performed without the need for detaching the stroller seat occupant support device 1290 from the frame 1210. Furthermore, the conversion from stroller to trike can be performed with an occupant seated on the occupant support device. This maximises the convenience of the apparatus in use and minimises the time required for converting the apparatus 1310 from stroller mode to trike mode and vice versa. For example, when a child is located on the apparatus 1310 in the trike mode (second configuration) and it suddenly becomes tired, it is possible to quickly convert the apparatus 1310 into a stroller by moving the frame 1210 from the second configuration to the first configuration, even with the child seated on the stroller seat 1290.

Figure 36:
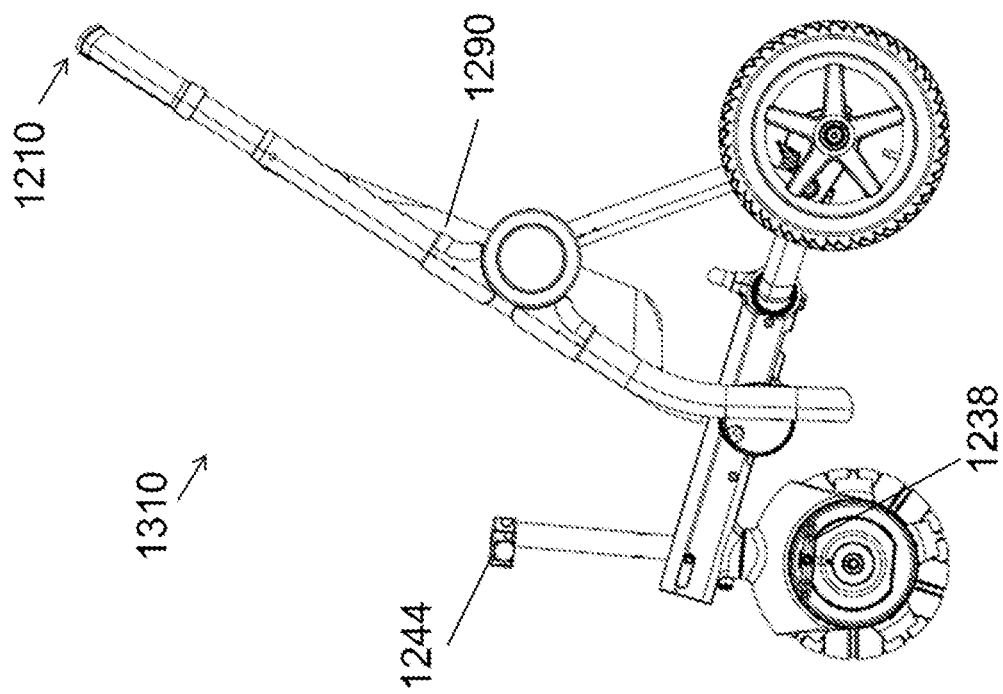
FIG. 36 shows a side view of the transportation apparatus of FIG. 35.
Figure 35:
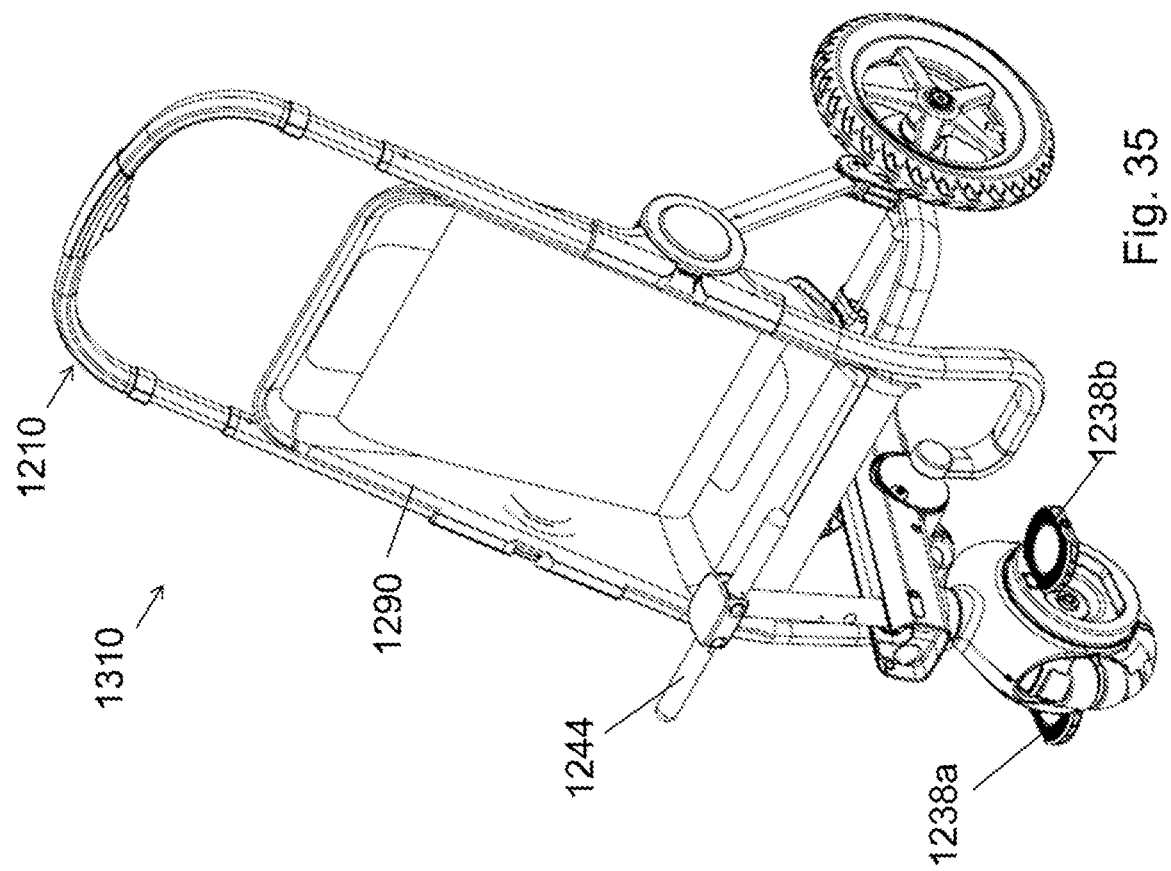
FIG. 35 shows a perspective view of the transportation apparatus of FIGS. 24-28 in the second configuration.

As shown in the perspective view (FIG. 35) and the side view (FIG. 36) of the apparatus 1310 in the trike mode, the frame 1210 is in the second configuration and the stroller seat 1290 is disposed in a more upright position and it is lower with respect to the base portion 1214 and closer to the front wheel 1232 in the second configuration shown in FIGS. 35 and 36 compared to the stroller mode shown in FIGS. 33 and 34, in which the frame is in the first configuration. In the first configuration shown in FIGS. 33 and 34 (stroller mode), the stroller seat 1290 and/or occupant thereof is provided in a more reclined position, i.e. with the stroller seat 1290 tilted towards the horizontal, which may facilitate relaxation and/or rest of the occupant, such as sleep.

In the second configuration shown in FIGS. 35 and 36, the stroller seat 1290 and/or occupant are provided at an inclination towards or nearer vertical, which is a more suitable posture for observing surroundings, interacting with the environment, and/or engaging into a physical activity, e.g. for using the pedals. Having the seat 1290 at a location lower and closer to the front wheel 1232 enables the occupant, for example a child, to reach the floor, the pedals 1238 and the steering member 1244 in order to engage in physical activity, such as pedaling and optionally propelling the apparatus 1310 or simply to play with the apparatus 1310 in a free wheeling trike mode when the pedals 1238a,b and the steering member 1244 are not engaged with the front wheel 1232.

Stroller seat 1290 has a detachable hood 1292 that can be releasably removed as required, for example if the apparatus is only used in the trike mode shown on FIGS. 35 and 36, for example if the occupant of the apparatus 1310 is an older child. The hood 1292 is advantageous to protect the occupant from the sun and/or rain and it may be useful particularly in the stroller mode to provide shade on the occupant to assist in the relaxation state and/or sleep of the occupant.

At least some embodiments are designed specifically to support the natural growth and constantly varying activity levels of young children whilst reducing the stressful challenges currently facing parents and guardians when travelling by foot.

At least some embodiments are a multifunction travel product designed for children aged or sized between birth and around 4 years which can be altered according to the child's needs; and in some embodiments for children aged or sized between around birth and around 4 years. Young children may in the course of the same journey need to rest or sleep or travel safely in a stroller or pram or move themselves along using a push-trike or push-bike, with or without adult support. At least some embodiments not only combine several products in one, they have the ability to be changed at any point during the duration of the journey without having to remove/unfasten the child.

At least some embodiments are a travel-system that offers a more convenient product to parents as it incorporates their needs by saving them money, time, space and the inconvenience of purchasing multiple products to supports and stimulate their child when travelling by foot. At least some embodiments are also designed to encourage the child to participate in the enjoyment of exercise through the push-trike and push-bike modes, addressing health concerns over inactive children.

At least some embodiments are a unique multi-functional travel solution product (i.e., providing several types of transport in 1) for ages from birth to about 4 years. At least some embodiments are a one stop solution for the child's travel needs avoiding the requirement to purchase a number of alternative travel systems, saving time, space and/or money. At least some embodiments are designed around the needs of both parent and child.

At least some embodiments require no additional parts to be added/removed during the transition of the different functionalities. At least some embodiments mean that the child is not removed/disturbed during the transition of the functionalities. In at least some embodiments, the product looks and functions as a stroller however has additional functions available.

It will be apparent to those of skill in the art that the above described embodiments are merely exemplary of the present invention, and that various modifications and improvements is made thereto, without departing from the scope of the invention.

It will be appreciated that any of the aforementioned apparatus 10, 110, 210, 310, 410, 1010, 1110, 1310 may have other functions in addition to the mentioned functions, and that these functions are performed by the same apparatus 10, 110, 210, 310, 410, 1010, 1110, 1310. It will also be appreciated that although the described embodiments only show one type of seat attached to the frame, two or more seat may be attachable to the frame simultaneously, e.g. by attaching each seat to a different engagement portion or location on the frame, for example to transport more than one child using the same apparatus.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications is made within the scope of the invention.

The invention claimed is:

1. A transportation apparatus comprising:
a frame, the frame having an engagement portion adapted to receive one or more occupant support devices,
wherein the frame has a first configuration and a second configuration, and wherein the engagement portion moves between the first configuration and the second configuration,
wherein the frame comprises a base portion and a top portion, wherein the top portion of the frame comprises or defines the engagement portion,
and wherein, in use, the frame is configured to move from the first configuration to the second configuration by moving the top portion forward and lower relative to the base portion of the frame.

2. The transportation apparatus of claim 1, wherein the apparatus comprises at least one wheel attached to the frame, wherein the engagement portion is located nearer the at least one wheel in the second configuration than in the first configuration.

3. The transportation apparatus of claim 1, wherein the apparatus comprises at least one front wheel attached to the frame, and wherein the engagement portion is located nearer the at least one front wheel in the second configuration than in the first configuration.

4. The transportation apparatus of claim 3, wherein the at least one front wheel comprises pedals for propelling, powering or driving the wheel.

5. The transportation apparatus of claim 4, wherein the pedals comprise two modes of operation and wherein:
the pedals are configured to move independently from the at least one front wheel for providing free-wheeling action in a first mode of operation and;
the pedals are locked relative to the at least one front wheel for allowing powering of the at least one front wheel in a second mode of operation.

6. The transportation apparatus of claim 3, wherein at least one wheel comprises an omni wheel.

7. The transportation apparatus of claim 1, wherein a position of the engagement portion when the apparatus is in the second configuration is lower and nearer a front end of the frame compared to the position of the engagement portion when the apparatus is in the first configuration.

8. The transportation apparatus of claim 1, wherein the frame is moveable from the first configuration to the second configuration with an occupant support device attached to the engagement portion.

9. The transportation apparatus of claim 1, wherein the engagement portion is adapted to releasably receive one or more occupant support devices selected from the group comprising a carrycot, a car seat, a midi seat, or a stroller seat, a bicycle saddle and/or tricycle saddle.

10. The transportation apparatus of claim 1, wherein the frame comprises a steering member for an occupant of the transportation apparatus.

11. The transportation apparatus of claim 10, wherein the steering member is foldable, wherein the steering member is configured to be folded and stored within the frame in the first configuration and wherein the steering member is configured to be deployed in the second configuration.

12. The transportation apparatus of claim 10, wherein the steering member is configured to be releasably engageable with the at least one front wheel to enable steering of the transportation apparatus.

13. The transportation apparatus of claim 1, wherein in use, the frame is configured to move from the first configuration to the second configuration by moving the top portion forward and lower relative to the base portion of the frame.

14. The transportation apparatus of claim 1, wherein the base portion provides at least one connection point for the top portion of the frame.

15. The transportation apparatus of claim 1, wherein the top portion is pivotally connected to the base portion.

16. The transportation apparatus of claim 1, wherein the first configuration and the second configuration are provided in a deployed and/or non-folded state of the transportation apparatus.

17. The transportation apparatus of claim 16, wherein the frame is movable from the first configuration to the second configuration without removal of the one or more occupant support devices or an occupant thereof.

18. The transportation apparatus of claim 1, wherein the top portion of the frame comprises two front arms and two rear arms, wherein the engagement portion is defined by a region of the two front arms.

19. The transportation apparatus of claim 18, wherein the two front arms are attached to the base portion by rotating barrels.

20. The transportation apparatus of claim 18, wherein the two rear arms are pivotally attached to the base portion of the frame.

21. The transportation apparatus of claim 18, wherein each of the two rear arms is hingedly connected to a respective one of the two front arms.

* * * * *